United States Patent
Alper et al.

(10) Patent No.: US 12,208,346 B2
(45) Date of Patent: Jan. 28, 2025

(54) BACKWASHABLE MEDIA BED FILTRATION SYSTEM AND DROP IN RETROFIT KIT FOR SAME

(71) Applicant: MYCELX TECHNOLOGIES CORPORATION, Duluth, GA (US)

(72) Inventors: Hal Alper, Flowery Branch, GA (US); Lance Rodeman, Katy, TX (US)

(73) Assignee: MYCELX TECHNOLOGIES CORPORATION, Duluth, GA (US)

( * ) Notice: Subject to any disclaimer, the term of this patent is extended or adjusted under 35 U.S.C. 154(b) by 0 days.

(21) Appl. No.: 17/498,620

(22) Filed: Oct. 11, 2021

(65) Prior Publication Data

US 2023/0112945 A1    Apr. 13, 2023

(51) Int. Cl.
*B01D 24/46* (2006.01)
*B01D 24/24* (2006.01)
(Continued)

(52) U.S. Cl.
CPC ......... *B01D 24/4631* (2013.01); *B01D 24/24* (2013.01); *B01D 24/4673* (2013.01);
(Continued)

(58) Field of Classification Search
CPC ............................ B01D 24/46; B01D 24/4631; B01D 24/4636; B01D 24/4652; B01D 24/02; B01D 24/4694; B01D 24/00; B01D 24/06; B01D 24/12; B01D 25/00; B01D 25/215; B01D 2201/04; B01D 29/0027; B01D 29/012; B01D 29/0093; B01D 29/19; B01D 29/44; B01D 29/46; B01D 29/62;
(Continued)

(56) References Cited

U.S. PATENT DOCUMENTS 4,547,288 A    10/1985  Little
4,642,182 A *  2/1987  Drori ..................... B01D 29/41
                                                      210/488

(Continued)

FOREIGN PATENT DOCUMENTS

CN       205627261 U  * 10/2016
KR     20110010597 U  * 11/2014
(Continued)

OTHER PUBLICATIONS

Machine generated translation of CN-205627261-U (Year: 2016).*
(Continued)

*Primary Examiner* — Magali P Slawski
*Assistant Examiner* — Bernadette Karen McGann
(74) *Attorney, Agent, or Firm* — Eversheds Sutherland (US) LLP

(57) ABSTRACT

This disclosure relates to filtration screens for use in a backwashable granular media bed filtration system. Drop-in retrofit kits for a backwashable granular media bed filtration system comprising one or more filtrations screens are provided herein. Such screens and kits can comprise a media support screen, a backwash filter screen, or a combination thereof. The kit can further comprise an agitator element comprising an impeller having vanes in which the impeller vane surfaces are coated with an abrasion resistant material. Associated filtration systems and processes are also described herein.

26 Claims, 10 Drawing Sheets

(51) Int. Cl.
*B01D 29/00* (2006.01)
*B01D 35/00* (2006.01)
*B01D 39/10* (2006.01)

(52) U.S. Cl.
CPC .......... *B01D 39/10* (2013.01); *B01D 24/4694* (2013.01); *B01D 29/00* (2013.01); *B01D 35/00* (2013.01); *B01D 2201/04* (2013.01); *B01D 2201/085* (2013.01)

(58) Field of Classification Search
CPC ........ B01D 35/00; B01D 39/10; B01D 39/12; B01D 49/70; B01D 2275/205; B01D 29/05; B01D 29/13; B01D 29/445; B01D 29/23; B01D 2029/033; B01D 2029/05; B01D 2201/0415; B01D 2201/0423; B01J 8/0292
USPC .......................................... 210/289, 291, 293
See application file for complete search history.

(56) References Cited

U.S. PATENT DOCUMENTS

| | | | |
|---|---|---|---|
| 4,643,836 A | 2/1987 | Schmid | |
| 5,112,504 A | 5/1992 | Johnson | |
| 5,723,051 A | 3/1998 | Bartelt et al. | |
| 5,779,895 A | 7/1998 | Biskner et al. | |
| 6,027,645 A | 2/2000 | Biskner et al. | |
| 6,030,529 A | 2/2000 | Biskner et al. | |
| 7,045,067 B2 | 5/2006 | Brown et al. | |
| 7,090,771 B2 | 8/2006 | Dyson et al. | |
| 7,223,347 B2 | 5/2007 | Boner et al. | |
| 7,270,745 B2 | 9/2007 | Schwartzkopf | |
| 2004/0007518 A1* | 1/2004 | Natale ................... | B01D 35/02 210/488 |
| 2015/0376889 A1 | 12/2015 | Ekholm et al. | |
| 2018/0078880 A1 | 3/2018 | Felch et al. | |
| 2019/0070531 A1* | 3/2019 | Medina ................. | B01D 29/21 |
| 2019/0076881 A1* | 3/2019 | Colgrove .............. | B07B 1/4618 |
| 2019/0218764 A1 | 7/2019 | Ekholm et al. | |
| 2020/0179829 A1 | 6/2020 | Friend et al. | |
| 2020/0298153 A1 | 9/2020 | Ekholm | |

FOREIGN PATENT DOCUMENTS

| | | | |
|---|---|---|---|
| WO | WO-2018191611 A1 * | 10/2018 | ............. B01D 29/33 |
| WO | 2019/067832 A1 | 4/2019 | |

OTHER PUBLICATIONS

Machine generated translation of KR 20110010597 U (Year: 2011).*
Table 1. Material Properties (US customary Units). Retrieved from https://app.knovel.com/hotlink/itble/rcid:kpPMDS0001/id:kt012OA307/matweb-plastic-material/table-1-material-properties (Year: 2004).*

* cited by examiner

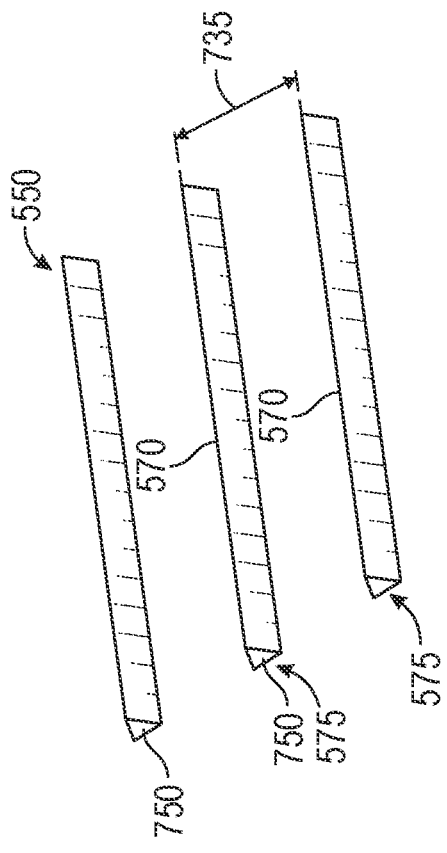
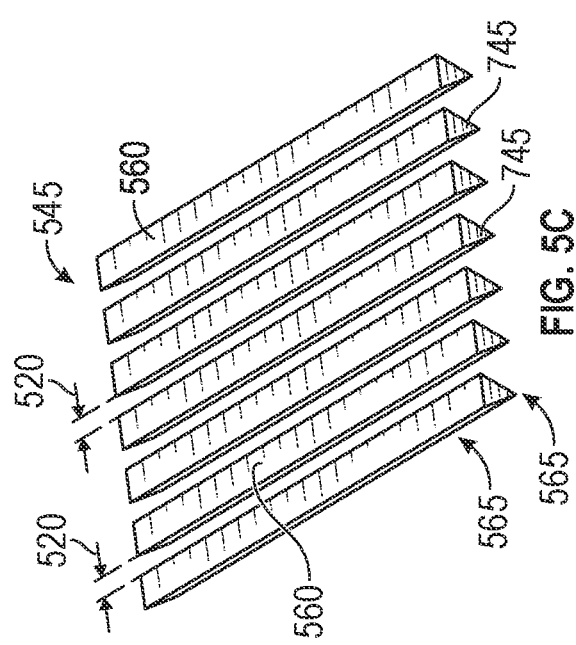
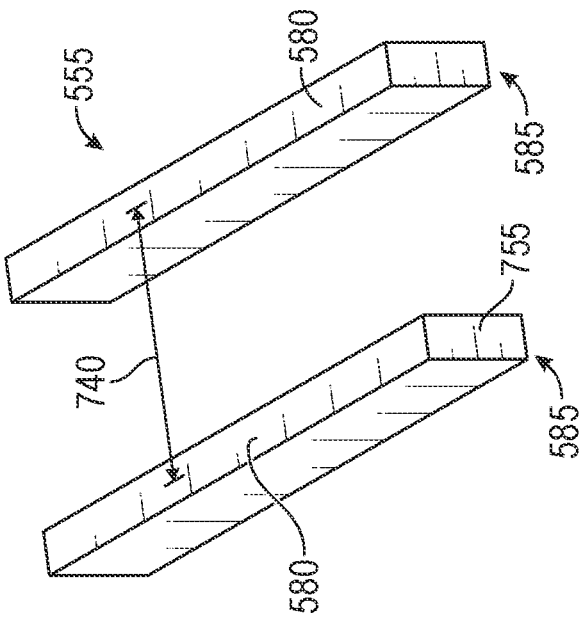
FIG. 5C
FIG. 5D
FIG. 5E

BACKWASHABLE MEDIA BED FILTRATION SYSTEM AND DROP IN RETROFIT KIT FOR SAME

TECHNICAL FIELD

This disclosure relates to a backwashable filtration system for filtering or separating oil, particulates, and oily particulates from water, including a retrofit kit for a filtration system.

BACKGROUND

Backwashable filters used for removal of oil, particulates and oily particulates commonly employ a filtration media made of nutshells, such as black walnut or pecan shells. Nutshell filters are particularly used in the oil and gas industry for removing oil and other contaminants from water produced from subterranean formations. However in some filtration applications, the performance of nutshell media may be limited. For example, filtration efficiency using nutshell media may be restricted due to inefficient packing density and moderate surface area and surface charge of the media. Nutshell media also may swell and deteriorate under high temperature conditions which may create fines and smaller particulates, adversely affecting the porosity of the media.

To address such limitations, new media have been developed which can exhibit improvements in one or more features such as packing density, surface area, or surface charge, and which may provide better filtration efficiency than nutshell. An example of such a filtration media is RE-GEN® (also known as REGEN®), commercially available from MyCelx Technologies Corporation, which comprises a microporous granular zeolite media. While the RE-GEN® media particles provide certain advantages over nutshell media, it has been discovered that substantial loss of the media through numerous and frequent backwash cycles occurs when RE-GEN® is used as a simple replacement for nutshell media in existing filtration units.

Therefore, what is needed are new backwashable media bed filtration systems that can be used with filtration media such as RE-GEN® without substantial loss of the media during frequent backwash cycles. In view of the large number of backwashable media bed filtration systems that are designed for use with nutshell media currently in use, what is also needed is a "drop-in" retrofit kit that could be installed in these traditional filtration systems, which would allow the use of filtration media like RE-GEN® to be used in the existing systems without excessive loss of media through backwashing.

SUMMARY OF THE DISCLOSURE

This disclosure provides, among other things, new backwashable granular media bed filtration systems, new backwash filter screens and media support screens for filtration systems, and new drop-in retrofit kits for conventional nutshell filtration systems which allow the use of the asymmetric granular filtration media such as RE-GEN® in conventional nutshell filtration systems. Specifically, these new filtration systems, filter screens, and retrofit kits of this disclosure have been developed which allow RE-GEN® to be used without the substantial loss of the media through numerous and frequent backwash cycles, and which address and solve the unexpected problems encountered when with using RE-GEN® as a simple replacement for nutshell media.

While the improvements in RE-GEN® media particles packing density, surface area, and/or surface charge as compared with nutshell media provide advantages in filtration efficiency over nutshell media, it has been discovered that the use of RE-GEN® media in traditional nutshell filtration devices such as the HYDROMATION® units provided some unexpected problems, the identification of and solution to which have been difficult and nonobvious. In one aspect, the RE-GEN® particles have a flaky and asymmetric shape in which a typical particle has a relatively high length-to-width (L/W) ratio and a depth (D) or thickness which is substantially smaller than either the length or width, that is, $L>W>>D$. However, it was found that simply redesigning the filter screens to accommodate typical particle dimensions still resulted in substantial loss of media. Therefore, redesigning these filter screens beyond simply adjusting the slot size from a conventional nutshell filter was required.

While not intending to be bound theory, it was discovered that in addition to their flaky and asymmetric shape, the mineral structure and surface morphology of the RE-GEN® particles appeared to be imparting unexpected behavior. For example, the "stepped" surface morphology of the RE-GEN® particles was discovered to can be causing the particles to lock together when formed into a filter bed, and thereby impart an unexpected rheological behavior to the granular filter bed. While this locking arrangement imparted good particle interception properties to the filter bed, the backwash impeller had to be operated at high speeds (revolutions-per-minute, RPM) to "unlock" the filter bed and form a slurry. Therefore, the strength and/or overall surface area of the backwash filter screen (also called a media retention screen) were increased to accommodate increased backwash flow rates and pressures in the filtration unit. In some aspects, the overall surface area of the backwash filter screen was also increased to assist in managing the increased backwash flow rates and pressures in the filtration unit. Operating the backwash impeller at high speeds to unlock the filter bed unexpectedly resulted in the production of fines, as the RE-GEN® media were sufficiently brittle under these high RPM conditions to fracture. Such high speed operation of the backwash impeller could also result in damage to the impeller at a higher rate than expected.

Therefore, the combination of surface morphology, high length-to-width ratio and the relatively small depth or thickness, brittleness under high impeller speeds, and other properties of the RE-GEN® particles appear to be contributing factors to the problems using RE-GEN® in traditional nutshell filtration devices. This disclosure describes newly developed backwash filter screens and media support screens for filtration systems, which are designed to function using unusually shaped filtration media such as RE-GEN®, and which are also resilient enough to withstand the severe pressures used in backwashing these media without damage to the screens and without excessive loss of granular media during backwashing. One or both of the backwash filter screen and the media support screen can be encompassed in a drop-in retrofit kit that can be retrofitted into a traditional nutshell filtration systems, so that RE-GEN® and other similarly asymmetric filtration media like RE-GEN® can be used without adverse effects. The retrofit kits can also include a backwash impeller that is coated with an abrasive resistant material such as a Buna-N rubber of a certain hardness.

In an aspect, this disclosure provides a backwash filter screen (also referred to as a media retention screen) for a backwashable granular media bed filtration system. The backwash filter screen can be included in a retrofit kit alone or in combination with a media support screen described below. For example, this disclosure provides a retrofit kit for a backwashable media bed filtration system, the kit comprising a backwash filter screen, wherein the backwash filter screen comprises, in series from an upstream side to a downstream side during a backwash cycle:
- (a) a first profile wire assembly comprising:
  - [1] multiple, spaced apart, parallel lengths of profile wire having an upstream edge and a downstream edge, wherein upstream edges of the profile wire and spaces therebetween define an upstream side of the first profile wire assembly;
  - [2] a profile wire cross sectional shape which decreases in width in a downstream direction from the upstream edge which is wider than a downstream edge;
  - [3] a space between adjacent parallel lengths of profile wire (slot width) at the upstream edges of the profile wire of from 0.007 inches to 0.013 inches; and
  - [4] a width of the upstream edge of the profile wire which provides a total space area (slot area) of from 20% to 30% of the total area of the upstream side of the first profile wire assembly;
- (b) a first support rod assembly attached to a downstream side of the first profile wire assembly and comprising multiple, spaced apart, parallel lengths of support rod oriented substantially orthogonal to the lengths of profile wire, the support rod and the first support rod assembly having an upstream edge and a downstream edge; and
- (c) a first stiffening rod assembly attached to a downstream side of the first support rod assembly and comprising multiple, spaced apart, parallel lengths of stiffening rod oriented substantially orthogonal to the lengths of support rod, the stiffening rod and the first stiffening rod assembly having an upstream edge and a downstream edge.

While the parallel lengths of profile wire in the first profile wire assembly can have different cross sectional shapes which decreases in width in a downstream direction from its upstream edge which is wider than a downstream edge, a common cross section shape is triangular.

In another aspect, this disclosure provides a media support screen for a backwashable granular media bed filtration system. The media support screen can be included in a retrofit kit alone or in combination with the backwash filtration screen described above. For example, this disclosure a retrofit kit for a backwashable granular media bed filtration system, the kit comprising the backwash filter screen as described above, and further comprising a media support screen, wherein the media support screen comprises in series from an upstream side to a downstream side during a filtration cycle:
- (a) a second profile wire assembly comprising:
  - [1] multiple, spaced apart, parallel lengths of profile wire having an upstream edge and a downstream edge, wherein upstream edges of the profile wire and spaces therebetween define an upstream side of the second profile wire assembly;
  - [2] a profile wire cross sectional shape which decreases in width in a downstream direction from the upstream edge which is wider than a downstream edge;
  - [3] a space between adjacent parallel lengths of profile wire (slot width) at the upstream edges of the profile wire of from 0.006 inches to 0.016 inches;
  - and [4] a width of the upstream edge of the profile wire which provides a total space area (slot area) of from 10% to 30% of the total area of the upstream side of the second profile wire assembly; and
- (b) a second support rod assembly attached to a downstream side of the second profile wire assembly and comprising multiple, spaced apart, parallel lengths of support rod oriented substantially orthogonal to the lengths of profile wire, the support rod and the second support rod assembly having an upstream edge and a downstream edge.

In another aspect, this disclosure provides a retrofit kit for a backwashable granular media bed filtration system, the kit comprising a backwash filter screen, a media support screen, or both a backwash filter screen and a media support screen. In an aspect, for example, the retrofit kits can include one or both of the new backwash filter screen and the new media support screen described herein, which can be shaped and sized to retrofit any model of the HYDROMATION® filter units which are in widespread use. The retrofit kit may also further comprise a backwashable filter impeller having vanes, wherein at least a portion of the impeller vane surfaces is coated with an abrasion resistant material. Backwash filter impellers are configured to attach to a drive element which rotates the impeller about an axis and disperses the granular filtration media within the liquid in a filtration tank during the backwash cycle. Because granular media such as RE-GEN® can be frangible when contacted by backwash filter impellers during the backwash cycle, retrofit kits can also include coated backwash filter impellers which reduces the incidence of breaking apart the RE-GEN® media.

In a further aspect, this disclosure provides a backwashable granular media bed filtration system, the system comprising:
- (a) a filter tank for containing a liquid and having [1] an internal space adapted to receive a contaminated liquid, [2] a first filter inlet adapted to direct a contaminated liquid into the filter tank, and [3] a first filter outlet adapted to direct a filtered liquid out of the filter tank;
- (b) a media support screen extending horizontally across a cross-section of the tank and having a top and a bottom, wherein the first filter inlet is upstream of the media support screen, and the first filter outlet is downstream of the media support screen;
- (c) a granular filtration media positioned within the filter tank upstream of the media support screen and which rests on top of the media support screen during a filtration cycle; and
- (d) a backwash agitator assembly, comprising: [1] an impeller having vanes positioned within the internal space of the tank and adapted to disperse the filtration media within the liquid contained in the tank; [2] a periodically-operated drive element adapted to rotate the impeller about an axis and disperse the filtration media within a backwash liquid during a backwash cycle; [3] a backwash filter screen positioned within the internal space of the tank above the granular filtration media when the granular filtration media is resting on top of the media support screen, and [4] a second filter outlet adapted to receive the backwash liquid after passage through the backwash filter screen during the backwash cycle and direct the backwash liquid out of the filter tank;

wherein the backwash filter screen, the media support screen, the impeller, or any combination thereof is as described and disclosed herein.

According to another aspect, there is provided in this disclosure a process for removing oil and particulate contaminants from contaminated water, the process comprising the steps of:
(a) flowing water contaminated with suspended oil droplets and/or particulates through a filter bed comprising a granular media supported on a media support screen;
(b) coalescing at least a portion of the oil droplets during flow and retaining the coalesced oil in the filter bed and retaining at least a portion of the particulates in the filter bed;
(c) terminating the flow of contaminated water after the coalesced oil and/or particulates have been retained in the filter bed;
(d) turbulently backwashing the filter bed with retained oil and particulate contaminants with a backwash liquid to release the contaminants, and separating the released contaminants from the backwashed filter bed through a backwash filter screen; and
(e) re-initiating the flow of water contaminated with suspended oil droplets and/or particulates through the filter bed;
wherein the backwash filter screen, the media support screen, or a combination thereof is as described and disclosed herein.

These and other aspects, embodiments and features are provided in the disclosure and appended claims.

BRIEF DESCRIPTION OF THE DRAWINGS

FIG. 3A FIG. 3 illustrates an embodiment of the backwash filter screen of this disclosure in which the backwash filter screen is provided in two modular sections which can be assembled and formed into a cylindrical shape inside the filter tank to retrofit the original backwash filter screen. Also illustrated is a portion of the drive element to which an impeller is attached and which rotates the impeller about an axis to disperse the granular filtration media within a liquid during the backwash cycle. The upstream side of backwash filter screen, the downstream side of backwash filter screen, the upstream direction of backwash filter screen, and the downstream direction of backwash filter screen are also shown.

In FIG. 3B can be seen the upstream edge of profile wire and upstream side of the first profile wire assembly, the upstream edge of support rod and upstream side of the first support rod assembly, the downstream edge of support rod and the downstream side of first support rod assembly, and the downstream edge of stiffening rod and the downstream side of first stiffening rod assembly. FIG. 3B is illustrative only of an embodiment, showing how each of the first profile wire assembly, the first support rod assembly, and the first stiffening rod assembly are assembled to make a backwash filter screen, and there is no significance to the number of profile wires, support rods, and stiffening rods used to illustrate the embodiment of FIG. 3B.

FIG. 5C illustrates an embodiment of a portion of the media support screen of this disclosure, showing a section of the second profile wire assembly, and illustrating the upstream edge of the profile wire and the upstream side of the second profile wire assembly and the downstream edge of the profile wire and the downstream side of second profile wire assembly. This drawing further illustrates the slot width between adjacent parallel lengths of profile wire in the media support screen and shows the profile wire cross section.

FIG. 5D illustrates an embodiment of a portion of the media support screen of this disclosure, showing a section of the second support rod assembly, and illustrating the upstream edge of the support rod and the upstream side of the second support rod assembly and the downstream edge of the support rod and the downstream side of second support rod assembly. This drawing further illustrates the distance between adjacent parallel lengths of support rod (center-to-center) in the media support screen and shows the support rod cross section.

FIG. 5E illustrates an embodiment of a portion of the media support screen of this disclosure, showing a section of the second stiffening rod assembly, and illustrating the upstream edge of the stiffening rod and the upstream side of the second stiffening rod assembly and the downstream edge of the stiffening rod and the downstream side of second stiffening rod assembly. This drawing further illustrates distance between adjacent parallel lengths of stiffening rod (center-to-center) in the media support screen and shows the stiffening rod cross section.

In FIG. 6B can be seen the upstream edge of profile wire and upstream side of the first profile wire assembly, the upstream edge of support rod and upstream side of the first support rod assembly, the downstream edge of support rod and the downstream side of first support rod assembly, and the downstream edge of stiffening rod and the downstream side of first stiffening rod assembly. FIG. 6B is illustrative only of an embodiment, showing how each of the first profile wire assembly, the first support rod assembly, and the first stiffening rod assembly are assembled to make a backwash filter screen, and there is no significance to the number of profile wires, support rods, and stiffening rods used to illustrate the embodiment of FIG. 6B.

DETAILED DESCRIPTION

Disclosed herein are new backwashable granular media bed filtration systems, new backwash filter screens and media support screens for these filtration systems, and new drop-in retrofit kits for traditional nutshell filtration systems. The new drop-in retrofit kits can include the new backwash filter screen, the new media support screen, or both, and can further include a coated backwash filter impeller if desired. These retrofit kit elements allow conventional nutshell backwashable filters such as the HYDROMATION® filter models, to be used with the asymmetric filtration media like RE-GEN®, without undesired effects due to the media's asymmetric shape and morphology, and without substantial loss of the media through numerous and frequent backwash cycles. The details of the backwash filter screen and the media support screen are set out here, followed by a general description of the operation of these screens in a conventional backwashable filtration system.

Figure 1:
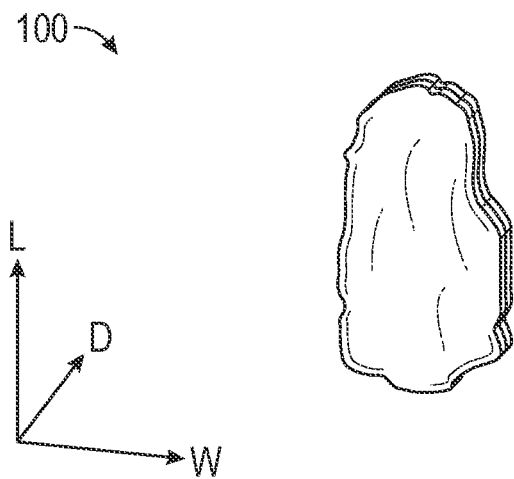
FIG. 1 illustrates, in an aspect, a representative shape of a typical RE-GEN® filtration media particle, which displays asymmetry and dissimilar length, width, and depth measurements and which resembles a very "flaky" or angular structure. As illustrated in this representative shape, the RE-GEN® particles have an asymmetric shape in which a typical particle has a relatively high length-to-width (L/W) ratio and a depth (D) or thickness which is substantially smaller than either the length or width, that is, L>W>>D. The shape of the typical RE-GEN® particle contrasts with the representative shape of a typical walnut shell filtration media particle, which displays greater symmetry than RE-GEN®, and similar length, width, and depth measurements. Therefore, in the walnut shell media, the length-to-width (L/W) ratio approximately 1, leading to a high circularity and low angularity of the particles, and the overall length (L), width (W), and depth (D) are such that L=W=D.

Backwash Filter Screen and Its Profile Wire. This disclosure provides backwash filter screens for use in new filtration systems or for retrofit kits in existing systems which allow the use of certain filtration media, such as the asymmetric RE-GEN® media commercially available from MyCelx Technologies Corporation. FIG. 1 illustrates in one embodiment a representative shape of a typical RE-GEN® filtration media particle 100, which displays asymmetry and dissimilar length, width, and depth measurements and which resembles a very "flaky" or angular structure having a high length-to-width (L/W) ratio and substantially smaller depth or thickness. The RE-GEN® media particles also have a very high packing density. While not intending to be bound by theory, it is thought that this high packing density may derives from the RE-GEN® particles' shape, and which makes their use in traditional filtration devices designed for nutshell media problematic.

Therefore, in one aspect, there is provided a retrofit kit for a backwashable granular media bed filtration system, the kit comprising a backwash filter screen, wherein the backwash filter screen comprises, in series from an upstream side to a downstream side during a backwash cycle:

(a) a first profile wire assembly comprising:

[1] multiple, spaced apart, parallel lengths of profile wire having an upstream edge and a downstream edge, wherein upstream edges of the profile wire and spaces therebetween define an upstream side of the first profile wire assembly;

[2] a profile wire cross sectional shape which decreases in width in a downstream direction from the upstream edge which is wider than a downstream edge;

[3] a space between adjacent parallel lengths of profile wire (slot width) at the upstream edges of the profile wire of from 0.007 inches to 0.013 inches; and

[4] a width of the upstream edge of the profile wire which provides a total space area (slot area) of from 20% to 30% of the total area of the upstream side of the first profile wire assembly;

(b) a first support rod assembly attached to a downstream side of the first profile wire assembly and comprising multiple, spaced apart, parallel lengths of support rod oriented substantially orthogonal to the lengths of profile wire, the support rod and the first support rod assembly having an upstream edge and a downstream edge; and (c) a first stiffening rod assembly attached to a downstream side of the first support rod assembly and comprising multiple, spaced apart, parallel lengths of stiffening rod oriented substantially orthogonal to the lengths of support rod, the stiffening rod and the first stiffening rod assembly having an upstream edge and a downstream edge.

The backwash filter screen can be shaped and sized the same as any backwash filter screen of a conventional or existing backwash filter unit to replace the existing back wash filter, or it can vary in certain dimension and still be able to fit as a replacement filter in an existing back wash filter.

Figure 2A:
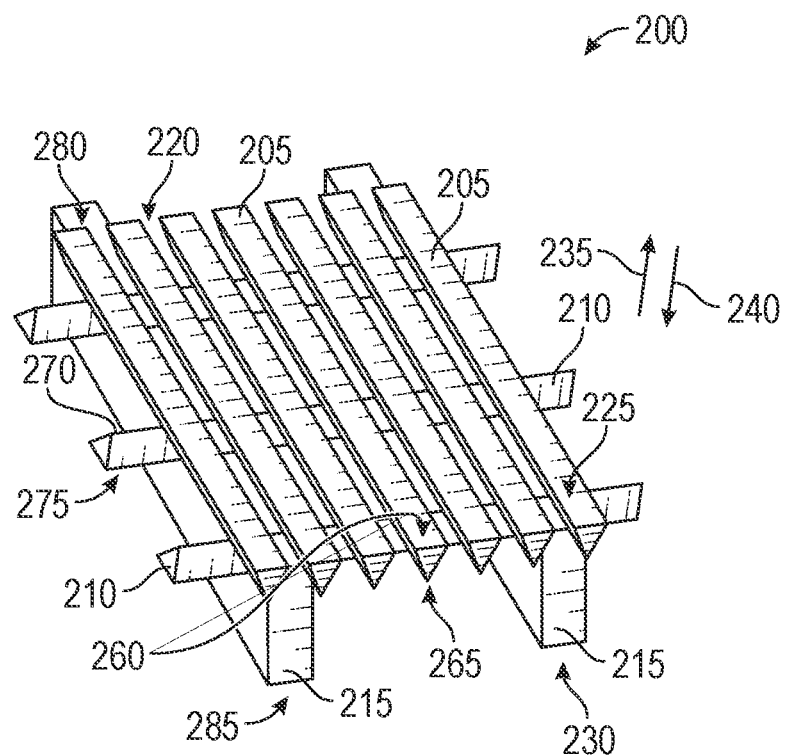
FIG. 2A illustrates an embodiment of a backwash filter screen according to this disclosure, showing a section of the backwash filter screen. Illustrated are the profile wire in the first profile wire assembly having a cross sectional shape which decreases in width in a downstream direction, the support rod in the first support rod assembly having a cross sectional shape which increases in width in the downstream direction, and the stiffening rod in the first stiffening rod assembly, or "stiffening ring" when the backwash filter screen is formed into a cylindrical structure, attached to a downstream side of the first support rod assembly. This figure also illustrates an embodiment of a media support filter screen in which the optional stiffening rod assembly or stiffening ring is present.

FIG. 2A illustrates an embodiment of a backwash filter screen 200 according to this disclosure, showing a section of the backwash filter screen (absent any curvature which would be present in a cylindrical embodiment). Illustrated are the profile wire 205 in the first profile wire assembly 245 having a cross sectional shape which decreases in width in a downstream direction 240, the support rod 210 in the first support rod assembly 250 having a cross sectional shape which increases in width in the downstream direction 240, and the stiffening rod 215 in the first stiffening rod assembly 255 or "stiffening ring", attached to a downstream side of the first support rod assembly. Also illustrated in FIG. 2A are the slot width between adjacent parallel lengths of profile wire 220, the upstream side of backwash filter screen 225, the downstream side of backwash filter screen 230, the upstream direction of backwash filter screen 235, the downstream direction of backwash filter screen 240, the upstream edge of profile wire and upstream side of first profile wire assembly 260, the downstream edge of profile wire and downstream side of first profile wire assembly 265, the upstream edge of support rod and upstream side of first support rod assembly 270, the downstream edge of support rod and downstream side of first support rod assembly 275, the upstream edge of stiffening rod and upstream side of first stiffening rod assembly 280, and the downstream edge of stiffening rod and downstream side of first stiffening rod assembly 285.

Figure 2C:
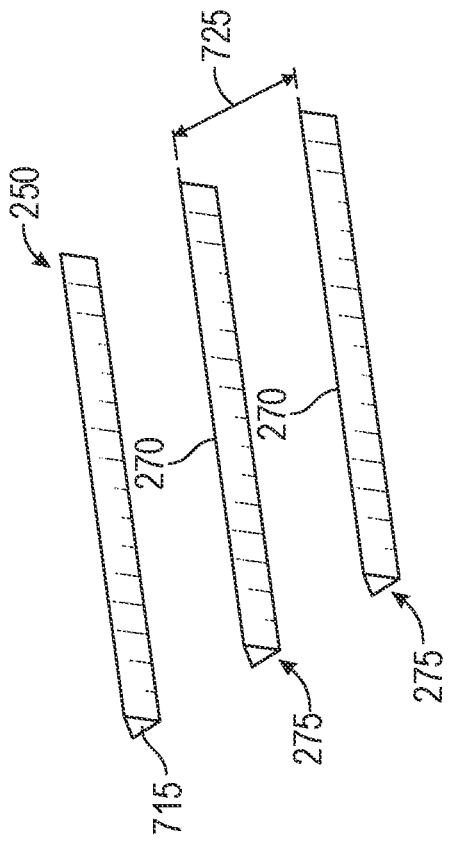
FIG. 2C illustrates an embodiment of a portion of the backwash filter screen of this disclosure, showing a section of the first support rod assembly, and illustrating the upstream edge of the support rod and the upstream side of the first support rod assembly and the downstream edge of the support rod and the downstream side of first support rod assembly. This drawing further illustrates the distance between adjacent parallel lengths of support rod (center-to-center) in the backwash filter screen and shows the support rod cross section.
Figure 2D:
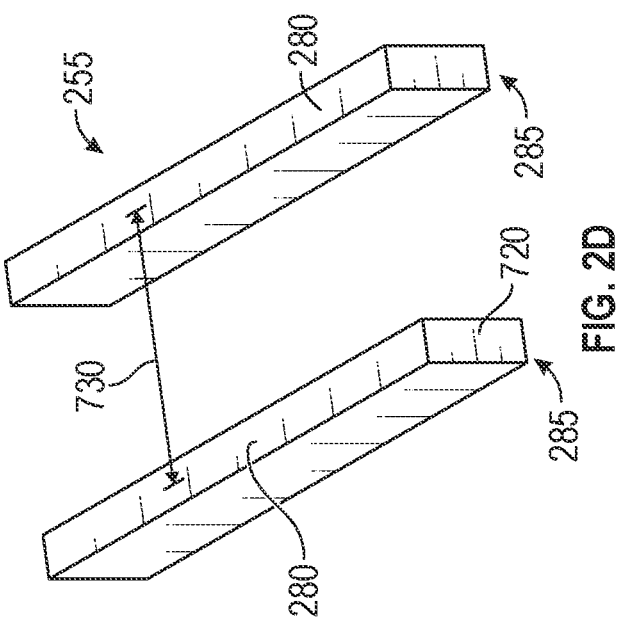
FIG. 2D illustrates an embodiment of a portion of the backwash filter screen of this disclosure, showing a section of the first stiffening rod assembly, and illustrating the upstream edge of the stiffening rod and the upstream side of the first stiffening rod assembly and the downstream edge of the stiffening rod and the downstream side of first stiffening rod assembly. This drawing further illustrates distance between adjacent parallel lengths of stiffening rod (center-to-center) in the backwash filter screen and shows the stiffening rod cross section.
Figure 2B:
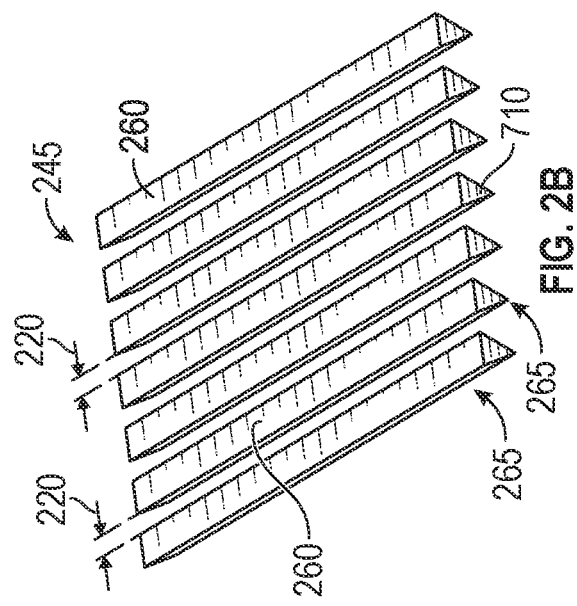
FIG. 2B illustrates an embodiment of a portion of the backwash filter screen of this disclosure, showing a section of the first profile wire assembly, and illustrating the upstream edge of the profile wire and the upstream side of the first profile wire assembly and the downstream edge of the profile wire and the downstream side of first profile wire assembly. This drawing further illustrates the slot width between adjacent parallel lengths of profile wire in the backwash filter screen and shows the profile wire cross section.

FIG. 2B, FIG. 2C, and FIG. 2D illustrate sections of the backwash filter screen embodiment shown in FIG. 2A, in which the FIG. 2A backwash filter screen is deconstructed to more clearly show the first profile wire assembly in FIG. 2B, the first support rod assembly in FIG. 2C, and the first stiffening rod assembly in FIG. 2D.

FIG. 2B illustrates a section of the first profile wire assembly 245, and illustrating the upstream edge of the profile wire and the upstream side of the first profile wire assembly 260, and the downstream edge of the profile wire and the downstream side of first profile wire assembly 265. This drawing further illustrates the slot width between adjacent parallel lengths of profile wire 220 in the first profile wire assembly and further shows the profile wire cross section 710.

FIG. 2C illustrates a section of the first support rod assembly 250, and illustrating the upstream edge of the support rod and the upstream side of the first support rod assembly 270 and the downstream edge of the support rod and the downstream side of first support rod assembly 275. This drawing further illustrates the center-to-center distance between adjacent parallel lengths of support rod 725 in the first support rod assembly and further shows the support rod cross section 715.

FIG. 2D illustrates a section of the first stiffening rod assembly 255, and illustrating the upstream edge of the stiffening and the upstream side of the first stiffening rod assembly 280 and the downstream edge of the stiffening rod and the downstream side of first stiffening rod assembly 285. This drawing further illustrates the center-to-center distance between adjacent parallel lengths of stiffening rod 730 in the first stiffening rod assembly and further shows the stiffening rod cross section 720.

In an aspect, the backwash filter screen 200 can comprise an cylindrical shape having an annular cross section with an outer surface and an inner surface, and having an interior space adapted to allow a backwash liquid to pass from the exterior of the backwash filter screen into the internal annular space during the backwash cycle. According to this aspect, the parallel lengths of profile wire can be formed into circumferential rings at the outer surface of the annular cross section. In these backwash filter screens, the parallel lengths of support rod can be oriented parallel to the length of the cylindrical shape and orthogonal (perpendicular) or substantially orthogonal to the lengths of profile wire. In this configuration, the parallel lengths of stiffening rod can be formed into circumferential rings at the inner surface of the annular cross section. When the backwash filter screen is formed into a cylindrical shape, the stiffening rod may be referred to as a stiffening ring. These backwash filter screens can be used with the RE-GEN® filtration media in nutshell backwashable filters such as the HYDROMATION® filter models.

Because the RE-GEN® media particles have a high length (L)-to-width (W) ratio and a significantly smaller depth (D), that is L>W>>D, their use in traditional filtration devices designed for nutshell particles presents problems with filtration media loss on backwashing. It has been discovered that adjustments to the spacings between adjacent parallel lengths of profile wire (the slot width) in the backwash filter screen at the upstream edges of the profile wire of from 0.007 inches to 0.013 inches allows the use of irregular particles such as RE-GEN® in existing nutshell filtration units. Alternatively, the space between adjacent parallel lengths of profile wire (slot width) at the upstream edge of the profile wire is from 0.008 inches to 0.012 inches, or alternatively from 0.009 inches to 0.011 inches. In an aspect, the space between adjacent parallel lengths of profile wire (slot width) at the upstream edge of the profile wire can be 0.010 inches or about 0.010 inches. Therefore, the spacings between adjacent parallel lengths of profile wire (the slot width) at the upstream edges of the profile wire can be about 0.007 inches, about 0.008 inches, about 0.009 inches, about 0.010 inches, about 0.011 inches, about 0.012 inches, or about 0.013 inches, including any ranges between any of these values. As disclosed herein, it has also been discovered that the addition of the stiffening ring or stiffening rod assembly to the backwash filter screen provides the needed strength to handle backwashing with such a filtration media.

Because of the relatively narrow openings (slots) between adjacent parallel lengths of profile wire, it is convenient to quantify the distance between adjacent parallel lengths of profile wire by the slot width at the upstream edges of the profile wire, that is, the width of the opening between adjacent lengths of profile wire. Because of the greater width of the openings between adjacent parallel lengths of support rod in the support rod assembly as compared with the width of the openings between adjacent parallel lengths of profile wire, it is convenient to quantify the distance between these adjacent lengths of support rod by the center-to-center distance between support rods.

It has also been found that adjustments to the width of the upstream edge of the profile wire to regulate the total space area (the slot area) relative to the total area of the upstream side of the first profile wire assembly enhances the productive use of irregular particles such as RE-GEN® in existing nutshell filtration units. In an aspect the width of the upstream edge of the profile wire in the backwash filter screen can provide a total space area (slot area) of from 20% to 30% of the total area of the upstream side of the profile wire assembly. Alternatively, the width of the upstream edge of the profile wire in the backwash filter screen can provide a total space area (slot area) of from 22% to 28% of the total area of the upstream side of the profile wire assembly. In an aspect, the width of the upstream edge of the profile wire in the backwash filter screen can provide a total space area (slot area) of 25% or about 25% of the total area of the upstream side of the profile wire assembly. Therefore, the width of the upstream edge of the profile wire can provide a total space area (slot area) in the backwash filter screen of about 20%, about 21%, about 22%, about 23%, about 24%, about 25%, about 26%, about 27%, about 28%, about 29%, or about 30% of the total area of the upstream side of the profile wire assembly, including any ranges between any of these values.

In an aspect, the width of the upstream edge of the profile wire in the backwash filter screen can vary and still provide the slot widths that work well in the backwash filter. For example, in an aspect, the upstream edge of the profile wire in the backwash filter screen can have a width of from 0.025 inches to 0.035 inches. Alternatively, the upstream edge of the profile wire in the backwash filter can have a width of from 0.028 inches to 0.032 inches, or alternatively the upstream edge of the profile wire can have a width of 0.030 inches or about 0.030 inches. In an aspect, for example, the profile wire of the backwash filter can comprise size 30 profile rod. Therefore, the upstream edge of the profile wire can have a width of about 0.025 inches, about 0.026 inches, about 0.027 inches, about 0.028 inches, about 0.029 inches, about 0.030 inches, about 0.031 inches, about 0.032 inches, about 0.033 inches, about 0.034 inches, or about 0.035 inches, including any ranges or combination of ranges between any of these values.

The term "profile wire" is used to reflect that the wire used in the profile wire assembly of both the backwash filter screen and the media support screen, and this profile wire can take on different cross section shapes, as long as the profile wire cross sectional shape decreases in width in a downstream direction from the upstream edge of the profile wire assembly which is wider than its downstream edge. Profile wire can also be termed "wedge wire", particularly when the cross section shape is triangular, but as used herein, "wedge wire" refers to any profile wire that can be used in the profile wire assembly according to this disclosure. In an aspect, the profile wire can have a cross sectional shape selected from polygonal, triangular, truncated triangular, truncated triangular with a rounded upstream edge, trapezoidal, trapezoidal with a rounded upstream edge, quadrilateral, semicircular, or T-shaped. A profile wire cross section that is triangular is particularly useful. The profile wire and profile wire assembly can comprise or be selected from a range of materials. Metals or materials which are resistance to abrasion and corrosion are particularly useful. In an aspect, the profile wire can comprise stainless steel, which provides a good balance of abrasion and corrosion resistance, strength, and reasonable cost.

Figure 3A:
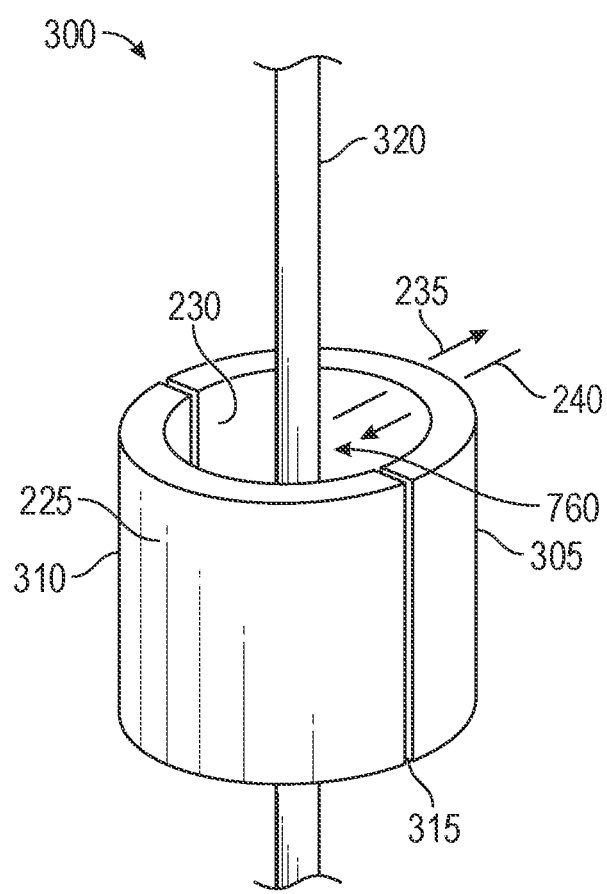
Figure 4:
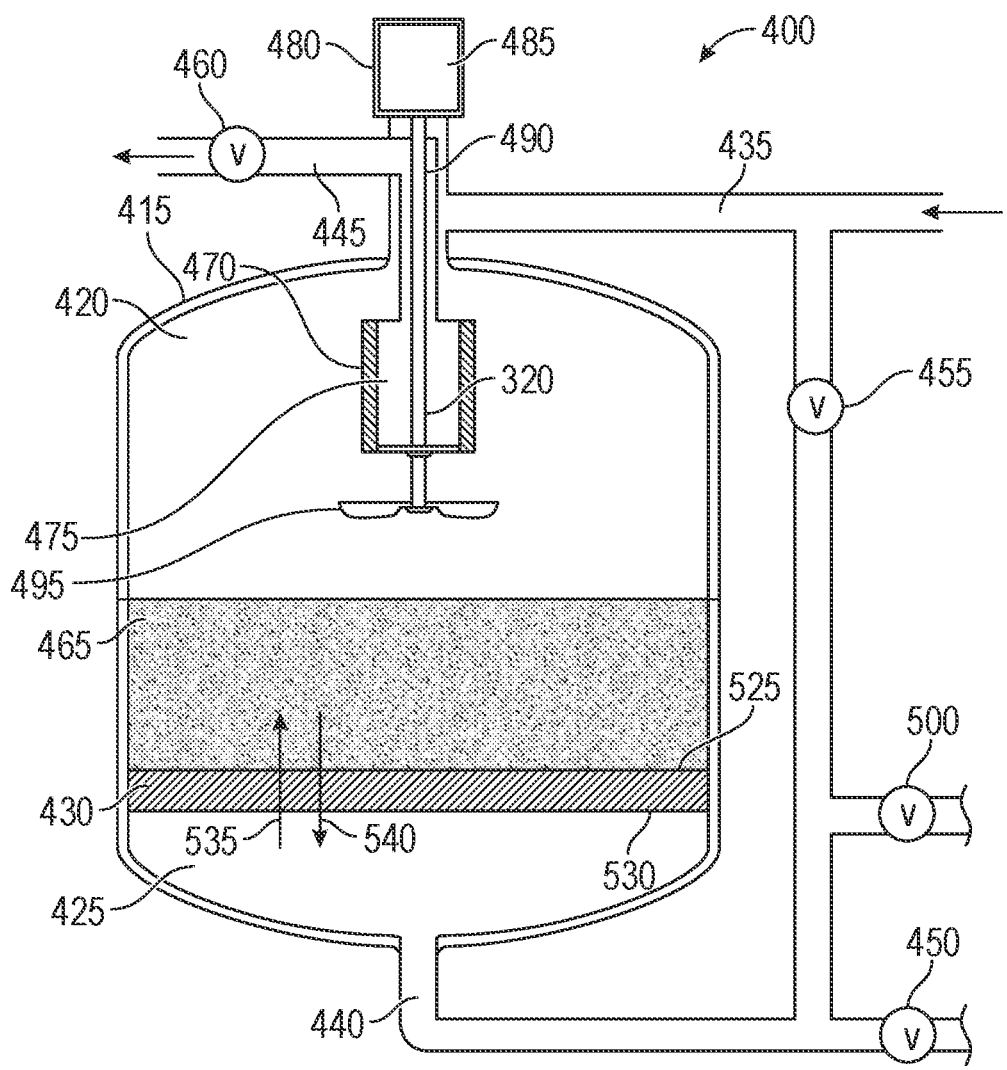
FIG. 4 illustrates an embodiment of a backwashable granular media filtration system, showing the backwash filter screen, the media support screen, and the impeller which can be coated with an abrasion resistant material.

Because the backwash filter screen can be used as a drop in retrofit screen to existing filtration units, the backwash filter screen can be formed into modular sections, which can be inserted into a backwash filtration tank in individual sections, assembled within the tank, and attached or secured. FIG. 3A illustrates an embodiment of the backwash filter screen 300 in which the backwash filter screen is provided in two modular sections which can be assembled inside the filter tank to retrofit the original backwash filter screen. In this two-part screen design, a first section of the backwash screen 305 and a second section of the backwash screen section 310 are illustrated. Each screen section can be sized to individually fit through the opening of a backwash filter tank and assembled inside. For example, a machined seam 315 is shown by which the first section of the backwash screen 305 and the second section of the backwash screen section 310 are joined, which can by secured, for example, with bolts. Also illustrated is a portion of the drive element 320 to which an impeller is attached and which rotates the impeller about an axis to disperse the granular filtration media within a liquid during the backwash cycle, which is also shown in FIG. 4. FIG. 3A also shows the upstream side of backwash filter screen 225, the downstream side of backwash filter screen 230, the upstream direction of backwash filter screen 235, the downstream direction of backwash filter screen 240, and the annular cross section of the backwash filter screen 760.

The backwash filter screen also can be formed into any number of modular sections which allow insertion and assembly of the sections, for example, from two to eight sections, or even more if necessary. According to an aspect, the backwash filter screen can be formed into two, three, four, five or six modular sections for assembly within a filter tank. In another aspect, the backwash filter screen can be formed into two, three, or four modular sections for assembly within a filter tank, or alternative, into two modular sections. The backwash filter screen in its assembled form can comprise a shape and size to retrofit an original backwash filter screen of a commercial agitator based backwashing nut shell media filter, including a shape and size which is the same as an original backwash filter screen.

Figure 3B:
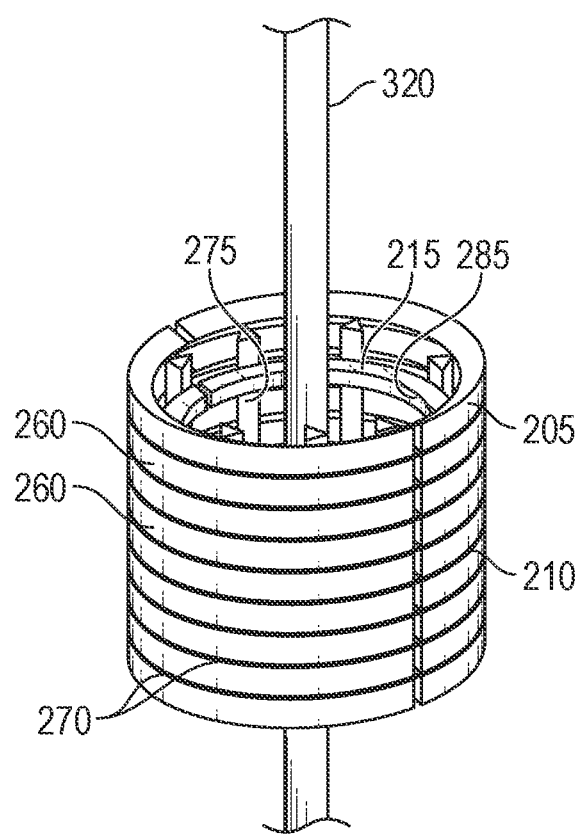
FIG. 3B illustrates an embodiment of a backwash filter screen of this disclosure, showing how two modular sections of the backwash filter screen such as shown in FIG. 2A can be formed into a cylindrical shape having an annular cross section and sized to replace the existing backwash filter of a conventional backwash filter unit. The implementation of this shaped backwash filter screen in a backwash filter unit is shown in FIG. 4.

FIG. 3B illustrates additional detail of the backwash filter screen embodiment of FIG. 3A, showing how a section of the backwash filter screen such as shown in FIG. 2A can be formed into a cylindrical shape having an annular cross section. The implementation of this shaped backwash filter screen in a backwash filter unit is shown in FIG. 4. FIG. 3B shows the profile wire 205, the support rod 210, and the stiffening rod 215. Also seen in this view of FIG. 3B are the upstream edge of profile wire 260 which corresponds to the upstream side of the first profile wire assembly 260, a portion of the upstream edge of support rod 270 which corresponds to the upstream side of the first support rod assembly 270 and which is seen in the space between adjacent lengths of profile wire, the downstream edge of support rod 275 which corresponds to the downstream side of first support rod assembly 275, stiffening rod 215 and the downstream edge of stiffening rod 285 which corresponds to the downstream side of first stiffening rod assembly 285. A portion of the drive element 320 to which an impeller is attached and which rotates the impeller about an axis to disperse the granular filtration media within a liquid during the backwash cycle, which is also shown in FIG. 4. FIG. 3B is illustrative only of an embodiment, showing how each of the first profile wire assembly, the first support rod assembly, and the first stiffening rod assembly are assembled to make a backwash filter screen. There is no significance to the specific number of profile wires 205 in the first profile wire assembly 260, the number of support rods 210 in the first support rod assembly 270, or the number of stiffening rods 215 in the first stiffening rod assembly 285 used to illustrate the embodiment of FIG. 3B.

The backwash filter screen according to this disclosure can comprise a shape and size equivalent to, or a shape and size sufficient to retrofit, an original backwash filter screen of any commercial HYDROMATION® filter. For example, the backwash filter screen can be sized and shaped equivalent to or to retrofit a HYDROMATION® filter Model Number FDB-7P, FDB-12P, FDB-19P, FDB-28P, FDB-39P, FDB-50P, FDB-64P, FDB-78P, FDB-95P, FDB-113P, FDB-133P, FDB-122P, FDB-162P, FDB-170P, FDB-243P, FDB-324P, FDB-340P, FDB-405P, or FDB-486P. These model numbers are exemplary and not limiting, as the backwash filter screen of this disclosure can be sized and shaped equivalent to or to retrofit any backwash filter screen of any backwashable filter.

In an aspect, it is not necessary that the retrofit backwash filter screen of this disclosure be sized and shaped precisely equivalent in all dimensions to an original backwash filter in a filtration unit to be retrofit, as long as the retrofit backwash filter can be installed and can function through the filtration cycle and backwash cycle without adversely affecting the function of the filtration unit. For example, a retrofit backwash filter can be sized and shaped equivalent in the dimensions relevant to attaching the filter internally to the original filtration unit without leaking, but may be larger or smaller in other dimensions. In an aspect, for example, the backwash filter screen can comprise an cylindrical shape having an annular cross section and an outer diameter (OD), in which the OD can be from 8% greater to 18% greater, from 10% greater to 15% greater, or from 12% greater to 14% greater than the OD of an original backwash filter screen of the HYDROMATION® agitator based backwashing nut shell media filter. In this example, the retrofit filter can otherwise comprise a size and shape to retrofit or to be equivalent to the original backwash filter screen.

Media Support Screen and Its Profile Wire. This disclosure also provides media support screens that can be incorporated into backwashable filtration units, or can be part of or can constitute a retrofit kit for a backwashable filtration unit. In an aspect, the construction of the media support screen can differ from that of the backwash filter screen in various ways. For example, in an aspect, the media support screen can comprise a profile wire assembly and a support rod assembly. A stiffening rod assembly can be optionally attached to a downstream side of the support rod assembly. In a further aspect, the details of the profile wire assembly can differ in the media support screen as compared with the backwash filter screen as described herein.

In an aspect, there is provided a media support screen for a backwashable granular media bed filtration system, which can be included in a retrofit kit alone or in combination with the backwash filtration screen described above. For example, this disclosure a retrofit kit for a backwashable granular media bed filtration system, the kit comprising the backwash filter screen as described above, and further comprising a media support screen, wherein the media support screen comprises in series from an upstream side to a downstream side during a filtration cycle:
  (a) a second profile wire assembly comprising:
    [1] multiple, spaced apart, parallel lengths of profile wire having an upstream edge and a downstream edge, wherein upstream edges of the profile wire and spaces therebetween define an upstream side of the second profile wire assembly;
    [2] a profile wire cross sectional shape which decreases in width in a downstream direction from the upstream edge which is wider than a downstream edge;
    [3] a space between adjacent parallel lengths of profile wire (slot width) at the upstream edges of the profile wire of from 0.006 inches to 0.016 inches; and
    [4] a width of the upstream edge of the profile wire which provides a total space area (slot area) of from 10% to 30% of the total area of the upstream side of the second profile wire assembly; and
  (b) a second support rod assembly attached to a downstream side of the second profile wire assembly and comprising multiple, spaced apart, parallel lengths of support rod oriented substantially orthogonal to the lengths of profile wire, the support rod and the second support rod assembly having an upstream edge and a downstream edge.

A stiffening rod assembly is generally not needed or not used in the media support screen in some aspects, as the internal design of the backwashable filter units can include other support structures that provide the desired stiffness to the media support screen such that a stiffening rod assembly is not required for the media support screen to function properly without damage. However, if desired, the media support screen described immediately above can further include:
  (c) a second stiffening rod assembly attached to a downstream side of the second support rod assembly and comprising multiple, spaced apart, parallel lengths of stiffening rod oriented substantially orthogonal to the lengths of support rod, the stiffening rod and the second stiffening rod assembly having an upstream edge and a downstream edge.

FIG. 2 also illustrates an embodiment of a media support screen 200 in which the optional stiffening rod assembly or stiffening ring is present, in which a section of the media support screen is shown. Illustrated are the profile wire 205 in the profile wire assembly having a cross sectional shape which decreases in width in a downstream direction, the support rod 210 in the support rod assembly having a cross sectional shape which increases in width in the downstream direction, and the stiffening rod 215 in the stiffening rod assembly, attached to a downstream side of the support rod assembly. The space 220 between adjacent parallel lengths of profile wire 205, also termed the slot width, in the first profile wire assembly in the backwash filter screen at the upstream edge of the profile wire is illustrated.

The media support screen can be shaped and sized the same as any media support screen of a conventional or existing backwash filter unit to replace the existing media support filter, or it can vary in certain dimension and still be able to fit as a replacement filter in an existing media support filter. The media support screen can be formed into a shape and size to extend horizontally across a cross-section of a vertically-oriented or a horizontally-oriented cylindrical filter tank of a backwashable granular media bed filtration system, or any other shape and size to be used in a backwashable granular media bed filtration system. For example, the media support screen can be formed into a disk shape to extend horizontally across a cross-section of a vertically-oriented cylindrical filter tank of a backwashable granular media bed filtration system.

According to an aspect, the media filtration screen can be formed into modular units or modular sections, which allow individual sections to be inserted into a filter tank for retrofitting and assembled inside the filter tank. For example, the media filtration screen can be formed into two, three, four, five, six, seven, or eight modular sections for assembly within a filter tank of a backwashable granular media bed filtration system. In an aspect, the media support screen can be formed into two modular sections, alternatively three modular sections, or alternatively four modular sections. When the media filtration screen can be formed into modular sections, some or all of the individual sections can be connected, for example with a hinge, which may permit easy deployment and retrofitting after being inserted. For example, the media support screen can be formed into two modular sections which are hinged together, which allows them to be folded in a collapsed configuration for insertion into the filter tank and unfolded in an expanded configuration for securing inside the tank.

In an aspect, the space between adjacent parallel lengths of profile wire (slot width) at the upstream edges of the profile wire in the media support screen can be from 0.006 inches to 0.016 inches, from 0.008 inches to 0.014 inches, or alternatively, from 0.009 inches to 0.012 inches. Alternatively, the space between adjacent parallel lengths of profile wire (slot width) at the upstream edges of the profile wire in the media support screen can be 0.010 inches or about 0.010 inches. Therefore, the space between adjacent parallel lengths of profile wire (slot width) at the upstream edges of the profile wire in the media support screen can be about 0.006 inches, about 0.007 inches, about 0.008 inches, about 0.009 inches, about 0.010 inches, about 0.011 inches, about 0.012 inches, about 0.013 inches, about 0.014 inches, about 0.015 inches, or about 0.016 inches, including any ranges or combination of ranges between any of these values.

A further aspect of this disclosure provides that the width of the upstream edge of the profile wire in the media support screen can provide a total space area (slot area) of from 10% to 30% of the total area of the upstream side of the profile wire assembly, from 12% to 27% of the total area of the upstream side of the profile wire assembly, or alternatively, from 15% to 25%, from 17% to 24%, from 19% to 23%, or from 20% to 22% of the total area of the upstream side of the profile wire assembly. The width of the upstream edge of the profile wire in the media support screen can provide a total space area (slot area) of 21%, 21.5%, about 21%, or about 21.5% of the total area of the upstream side of the profile wire assembly. In this aspect, the width of the upstream edge of the profile wire in the media support screen can provide a total space area (slot area) of about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, or about 30% of the total area of the upstream side of the profile wire assembly, including any ranges between any of these values.

The profile wire in the profile wire assembly of the media support screen can have, in an aspect, an upstream edge having a width of from 0.020 inches to 0.045 inches, from 0.025 inches to 0.035 inches, or alternatively from 0.028 inches to 0.032 inches. The upstream edge of the profile wire of the media support screen is the upstream edge when the filtration unit is operated in the filtration mode and the media is supported on the upper surface of the screen. In this aspect, the upstream edge of the profile wire in the media support screen can have a width of 0.030 inches or about 0.030 inches, and the profile wire of the media support screen can comprise size 30 profile rod. Therefore, the upstream edge of the profile wire of the media support screen can have a width of about 0.020 inches, about 0.021 inches, about 0.022 inches, about 0.023 inches, about 0.024 inches, about 0.025 inches, about 0.026 inches, about 0.027 inches, about 0.028 inches, about 0.029 inches, about 0.030 inches, about 0.031 inches, about 0.032 inches, about 0.033 inches, about 0.034 inches, about 0.035 inches, about 0.036 inches, about 0.037 inches, about 0.038 inches, about 0.030 inches, about 0.040 inches, about 0.041 inches, about 0.042 inches, about 0.043 inches, about 0.044 inches, or about 0.045 inches, including any ranges or combination of ranges between any of these values.

When using the term "profile wire" or "wedge wire" in describing the media support screen, this term is also used to reflect that the wire used in the profile wire assembly can take on different cross section shapes, as long as the profile wire cross sectional shape decreases in width in a downstream direction from the upstream edge of the profile wire assembly which is wider than its downstream edge. Therefore, as used herein, the term "wedge wire" refers to any profile wire that can be used in the profile wire assembly of according to this disclosure. In an aspect, the profile wire of the media support screen can have a cross sectional shape selected from polygonal, triangular, truncated triangular, truncated triangular with a rounded upstream edge, trapezoidal, trapezoidal with a rounded upstream edge, quadrilateral, semicircular, or T-shaped. The profile wire and profile wire assembly of the media support screen also can comprise or be selected from a range of materials, with metals or materials which are resistance to abrasion and corrosion being particularly useful. In this aspect, the profile wire of the media support screen can comprise stainless steel, which provides a good balance of abrasion and corrosion resistance, strength, and reasonable cost.

The media support filter screen according to this disclosure can comprise a shape and size equivalent to, or a shape and size sufficient to retrofit, an original backwash media support filter screen of any commercial HYDROMATION® filter. For example, the media support filter screen can be sized and shaped equivalent to or to retrofit a HYDROMATION® filter Model Number FDB-7P, FDB-12P, FDB-19P, FDB-28P, FDB-39P, FDB-50P, FDB-64P, FDB-78P, FDB-95P, FDB-113P, FDB-133P, FDB-122P, FDB-162P, FDB-170P, FDB-243P, FDB-324P, FDB-340P, FDB-405P, or FDB-486P. These model numbers are exemplary and not limiting, as the media support filter screen of this disclosure can be sized and shaped equivalent to or sized and shaped to retrofit any media support filter screen of any backwashable filter, such as a commercial agitator based backwashing nut shell media filter.

Support Rod and Support Rod Assembly. The backwash filter screen and the media support screen each include a support rod assembly attached to a downstream side of the profile wire assembly of each screen and comprising multiple, spaced apart, parallel lengths of support rod, which are oriented substantially orthogonal or perpendicular to the lengths of profile wire. The support rod assembly may be referred to herein as a first support rod assembly when it is part of the backwash filter screen, and a second support rod assembly when it is part of the media support screen. Unless specified to the contrary or the context requires otherwise, descriptions of the support rod assembly which are not stated as applicable specifically to only one of the backwash filter screen or the media support screen are applicable to both the backwash filter screen and the media support screen.

For fully describing the structure of each of the backwash filter screen and media support screen, the support rod and the support rod assembly are described as having an upstream edge and a downstream edge, and each is relative to the direction of fluid flow during the particular cycle in which each screen is operating to retain the filtration media such as RE-GEN® inside the filter tank. Therefore, the upstream and downstream edges of the backwash filter screen are relative to the fluid flow during the backwash cycle, and the upstream and downstream edges of the media support filter screen are relative to the fluid flow during the filtration cycle.

The support rod and the support rod assemblies function as structures on which to anchor and fasten the profile wire and profile wire assembly in each of the backwash filter screen and media support screen. Unlike the profile wire in the profile wire assembly which has a cross sectional shape which decreases in width in a downstream direction from a wider upstream edge to a more narrow downstream edge during fluid flow through the screen, the support rod has a cross sectional shape which increases in width in the downstream direction from an upstream cross sectional edge which is narrower than a downstream cross sectional edge. As a result, the smaller edge of the profile wire is connected, for example welded, to the smaller edge of the support rod. FIG. 2 illustrates this arrangement in a backwash filter, which also depicts a media support filter in which a stiffening rod assembly is present.

According to an aspect, the support rod of the support rod assembly in the backwash filter screen or the media support screen can have a cross sectional shape selected from polygonal, circular, triangular, truncated triangular, truncated triangular with a rounded upstream or downstream edge, trapezoidal, trapezoidal with a rounded upstream edge, rectangular, quadrilateral, square, semicircular, V-shaped, or T-shaped. Again, the cross sectional shape of the support rod increases in width in the downstream direction from an upstream cross sectional edge which is narrower than a downstream cross sectional edge.

The support rod assembly in the backwash filter screen or the media support screen, independently, can have a distance between adjacent parallel lengths of support rod (center-to-center) at the upstream edge of the support rod of from about 2.0 inches to about 5.6 inches. Alternatively, the support rod assembly in either the backwash filter screen or the media support screen, independently, can have a distance between adjacent parallel lengths of support rod (center-to-center) at the upstream edge of from about 2.4 inches to about 5.2 inches, from about 2.8 inches to about 4.8 inches, from about 3.2 inches to about 4.4 inches, or from about 3.6 inches to about 4.2 inches. In an aspect, the distance between adjacent parallel lengths of support rod (center-to-center) at the upstream edge of the support rod assembly in the backwash filter screen and the media support screen can be, independently, about 2.0 inches, about 2.2 inches, about 2.4 inches, about 2.6 inches, about 2.8 inches, about 3.0 inches, about 3.2 inches, about 3.4 inches, about 3.6 inches, about 3.8 inches, about 4.0 inches, about 4.2 inches, about 4.4 inches, about 4.6 inches, about 4.8 inches, about 5.0 inches, about 5.2 inches, about 5.4 inches, or about 5.6 inches, including any ranges between any of these values. For example, the center-to-center distance between adjacent parallel lengths of support rod at the upstream edge can be 3.8 inches or 4.0 inches.

In some embodiments, the support rod used in the backwash filter screen or the media support screen can have a rectangular cross section, in which the shorter edges of the cross section are oriented toward the upstream and the downstream directions when each screen is actively functioning in the backwash cycle or the filtration cycle, respectively. That is, the support rod having a rectangular cross sectional shape has an upstream, a downstream, and two side cross sectional edges, wherein the length of the two side cross section edges is greater than the length of the upstream and downstream cross sectional edges. By orienting the support rod and support rod assembly in this manner, excellent support of the profile wire assembly can be achieved.

In embodiments, the support rod assembly in the backwash filter screen or the media support screen can have [a] a width of the upstream edge of the support rod and [b] a distance between adjacent parallel lengths of support rod (center-to-center) which can provide a total space area (slot area) of the support rod which is greater than or equal to the total space area of the profile wire. That is, it is not necessary that the support rods in the support rod assembly be as closely spaced as the profile wire in the profile wire assembly. In an aspect, [a] the width of the upstream edge of the support rod and [b] the distance between adjacent parallel lengths of support rod (center-to-center) provide a total space area (slot area) of the support rod which is 2, 3, 4, 5, 6, 7, 8, 9, 10 or more times greater than the total space area of the profile wire in the profile wire assembly. According to an aspect, the upstream edge of the support rod can have a width of from 0.015 inches to 0.035 inches, alternatively from 0.018 inches to 0.032 inches, or alternatively from 0.020 inches to 0.030 inches.

In embodiments, the support rod and support rod assembly in the backwash filter screen or the media support screen can comprise or be selected from a range of materials. Metals or materials which are resistance to abrasion and corrosion are particularly useful, and in this aspect, the support rod can comprise stainless steel, which provides a good balance of abrasion and corrosion resistance, strength, and reasonable cost. For example, the support rod can comprise number 130 stainless steel Stiffening Rod and Stiffening Rod Assembly. In an aspect, this disclosure also provides a stiffening rod assembly as part of the backwash filter screen, which is attached to the downstream side of the support rod assembly and which comprises multiple, spaced apart, parallel lengths of stiffening rod oriented substantially orthogonal to the lengths of support rod. The stiffening rod and the stiffening rod assembly are also described in terms of having an upstream edge and a downstream edge. The stiffening rod assembly is optionally used in the media support screen, and the stiffening rod assembly may be referred to herein as a first stiffening rod assembly when it is part of the backwash filter screen, and a second stiffening rod assembly when it is part of the media support screen. Unless specified to the contrary or the context requires otherwise, descriptions of the stiffening rod assembly which are not specified as applicable specifically to the backwash filter screen or the media support screen are applicable to both the backwash filter screen or the media support screen.

FIG. 2 illustrates an embodiment of a backwash filter screen 200, showing the profile wire assembly, the support rod assembly, and the stiffening rod assembly or "stiffening ring". This figure also illustrates an embodiment of a media support filter screen in which the optional stiffening rod assembly or stiffening ring is present. The term "stiffening ring" is used in particular to describe the stiffening rod assembly of the backwash filter screen in which the parallel lengths of profile wire are formed into equally sized circumferential rings at the outer surface of the backwash filter screen, which form the outer surface of an annular cross section of the backwash filter screen, in which the backwash filter screen and annular cross section have a vertical axis. In this arrangement, the parallel lengths of support rod can be oriented parallel to the axis and parallel to the length of the cylindrical shape and orthogonal (perpendicular) or substantially orthogonal to the lengths of profile wire. As a result, the parallel lengths of stiffening rod are formed into circumferential rings at the inner surface of the annular cross section in this arrangement, and may be termed a stiffening "ring".

In an aspect, the stiffening rod which makes up the stiffening rod assembly can have a cross sectional shape selected from polygonal, circular, triangular, truncated triangular, truncated triangular with a rounded upstream or downstream edge, trapezoidal, trapezoidal with a rounded upstream edge, rectangular, quadrilateral, square, semicircular, V-shaped, or T-shaped. In another aspect, the stiffening rod can have a rectangular cross sectional shape with an upstream, a downstream, and two side cross sectional edges, wherein the length of the two side cross section edges being greater than the length of the upstream and downstream cross sectional edges.

In an aspect of this disclosure, the distance between adjacent parallel lengths of stiffening rod (center-to-center) at the upstream edge of the stiffening rod can be from about 2.2 inches to about 6.0 inches. Alternatively, the distance between adjacent parallel lengths of stiffening rod (center-to-center) at the upstream edge of the stiffening rod can be from about 2.7 inches to about 5.5 inches, from about 3.1 inches to about 5.1 inches, or from about 3.5 inches to about 4.7 inches. In an aspect, the distance between adjacent parallel lengths of stiffening rod (center-to-center) at the upstream edge of the stiffening rod assembly can be about 2.2 inches, about 2.4 inches, about 2.6 inches, about 2.8 inches, about 3.0 inches, about 3.2 inches, about 3.4 inches, about 3.6 inches, about 3.7 inches, about 3.8 inches, about 3.9 inches, about 4.0 inches, about 4.1 inches, about 4.2 inches, about 4.3 inches, about 4.4 inches, about 4.6 inches, about 4.8 inches, about 5.0 inches, about 5.2 inches, about 5.4 inches, about 5.6 inches, about 5.8 inches, or about 3.0 inches, or any ranges between any of these values. For example, the distance between adjacent parallel lengths of stiffening rod (center-to-center) at the upstream edge of the stiffening rod is about 4 inches, or alternatively, about 4.1 inches.

According to another aspect, the stiffening rod assembly can include any number of multiple parallel lengths of stiffening rods and any spacing between the multiple parallel lengths of stiffening rods, which are sufficient for the backwash filter screen to withstand any damage upon backwashing. Based upon the backwashing conditions, being able to withstand any damage means that the stiffening rod assembly comprises a number and a spacing between the multiple parallel lengths of stiffening rods sufficient for the media support screen or the backwash filter screen to withstand at least 50 psid (pounds per square inch differential) pressure without irreversible deflection of the support rod assembly by an amount of L/240, wherein L is the length of the parallel lengths of support rod in the support rod assembly.

In embodiments, the stiffening rod and stiffening rod assembly in the backwash filter screen or in the media support screen, when present, can comprise or be selected from a range of materials. Metals or materials which are resistance to corrosion are particularly useful, and in this aspect, the stiffening rod can comprise stainless steel, which provides a good balance of corrosion resistance, strength, and reasonable cost. For example, the support rod can comprise number 130 stainless steel.

Backwashable Filtration Systems and the Backwashing Cycle. The new backwash filter screens and media support screens according to this disclosure can be used in any type of backwashable filtration system, including existing commercial filtration systems in which the backwash filter screen, the media support screen, or both can constitute a drop-in retrofit kits for the conventional nutshell filtration systems. By accommodating asymmetric filtration media having a high packing density such as RE-GEN®, the new backwash filter screen and the media support screen can help reduce the loss of RE-GEN® through the backwash filter screen, maintain the performance of the media over a greater number of backwash cycles, and reduce costs and downtime in operating the filtration system.

Several aspects of the underlying granular media filtration system and its various embodiments, components, and methods of operation are provided in U.S. Pat. Nos. 5,171, 433 and 6,287,474, each of which is incorporated by reference herein in its entirety.

One simplified embodiment of a backwashable filtration system in which these components can be used are illustrated in a cross-sectional view of FIG. 4. Illustrated are the backwashable granular media bed filtration system 400, which includes tank 415 having an upper (top) portion 420 and a lower (bottom) portion 425. Extending horizontally across a cross section of tank 415 is the media support screen 430. Also illustrated are the upstream side of media support screen 525, the downstream side of media support screen 530, the upstream direction of media support screen 535, and the downstream direction of media support screen 540. The system also include a contaminated water inlet 435, a filtered water outlet 440, and a backwash outlet 445. A water outlet valve 450, a flush valve 455, and a backwash valve 460 control the fluid flow throughout the filtration and backwash cycles. The granular media filter bed 465 rests atop the media support screen 430. The backwash filter screen 470 having an internal annular space 475 is also shown situated in the top portion 420 of the tank. In some embodiments struts can extend from the backwash filter screen to the inner wall of the tank for stability. The backwash agitator assembly 480 is shown, which can include a motor 485, a drive shaft or drive element 490, and an impeller 495. In this embodiment, the drive element 490 extends in a concentric fashion through a portion of the backwash outlet pipe 445 and through the interior annular space 475 of backwash filter screen 470. Thus, the backwash filter screen 470 and the media support screen 430 can be those according to this disclosure which are designed to accommodate the asymmetric filtration media such as the RE-GEN® granular filtration media which has a high packing density.

In the filtration mode, valves 455 and 460 are closed such that water to be filtered passes into the upper portion 420 of tank 415 through the contaminated water inlet 435 and is filtered through the granular media filter bed 465 and filtered water passes through the media support screen 430 and exits the filtered water outlet 440. While a simple gravity feed can be used to move the contaminated water from the tank through the filter bed and media support screen, outlet 440 also may be connected to a pump to provide a vacuum to draw the liquid through the filter bed, or the upper portion of the tank can be pressurized to provide flow of the liquid through the filter bed.

When the granular media filter bed 465 becomes loaded or saturated with oil and oily particulates, flow of contaminated water through inlet 435 can be stopped and outlet 440 can be closed, and valve 455 can be opened to equilibrate pressure between the upper portion 420 and the lower portion 425 of tank 415. The motor 485 and drive element 490, which are designed to be periodically-operated to rotate the impeller 446 about the drive element axis, can now be activated to agitate and disperse the granular filtration media of the media bed 465 within the liquid and form a slurry, which releases the trapped oil, particulates, and oily particulates. In one aspect, the impeller can have downwardly facing impeller blades which upon rotation at a sufficient velocity, set up a vertical recirculation by agitating the liquid and media to cause a slurry to be formed. In an aspect, at least a portion of the impeller vane surfaces can be coated with an abrasion resistant material to provide protection from shattering the RE-GEN® filtration media during high RPM operation. While operating the drive element and impeller 490, backwash valve 460 can be opened to allow the contaminants entrained in the water to pass through backwash filter screen 470 into the interior annular space 475 of the backwash filter screen, and exit the tank through the backwash outlet 445, while the backwash filter screen prevents, reduces, or minimizes the loss of granular media through the backwash filter. As water and contaminants exit backwash outlet 445, make-up water can enter the tank through 435 and 440.

When backwashing is completed, rotation of the impeller is discontinued, the valves 455 and 460 are closed, and the dispersed granular filtration media is allowed to settle and reform the granular media bed 465 which again rests atop the media bed filter 430. Once the media bed reforms, water to be filtered again enters contaminated water inlet 435 into the tank. Because the lower portion of the tank 425 now contains contaminated water, water which initially passes through the media bed filter can be routed through recirculation valve 500 while valve 450 is closed, which prevents contamination of the filtered water. After the contaminated water is flushed from the lower portion of the tank 425, recirculation valve 500 is closed and water outlet valve 450 is reopened to reinitiate the filtration mode.

In some embodiments, the impeller vanes can be of any shape, size, and number which are suitable for agitating the liquid and granular filtration media to form a slurry within a particular filtration unit. Backwash impeller designs can vary considerably, and other embodiments of backwashable filtration units, including backwash filter screens and impellers are illustrated in U.S. Pat. Nos. 5,171,433 and 6,287,474, which are incorporated by reference in their entireties. For example, the backwash impeller can be located on the drive element below the backwash filter screen as illustrated in FIG. 4, and the impeller can have a diameter larger, smaller, or about the same as the diameter of the backwash filter screen. In other embodiments an impeller can be located above the backwash filter screen. In some embodiments, a second impeller can be located within the diameter of internal annular space of the back wash filter screen, with impeller tips closely spaced to the interior surface of the backwash filter screen. In this embodiment, the small clearance of the impeller blades can create sufficient turbulence at the outer surface of the backwash filter screen to dislodge any granular media from screen openings and prevent clogging of the backwash filter screen.

Perforated Media Support Screen. While the media support screen for a backwashable granular media bed filtration system has been described herein as comprising (a) a profile wire assembly and (b) a support rod assembly attached to a downstream side of the profile wire assembly, the media support screen may also use a perforated sheet metal layer in place of a profile wire assembly, in combination with a support rod assembly. In this aspect, for example, the media support screen can comprise in series from an upstream side to a downstream side during a filtration cycle:

(a) a perforated sheet metal layer, comprising perforations having a major axis which impart an open area to the perforated sheet metal layer of from 10% to about 50%, and an average size (major axis) of from 0.008 inches to 0.016 inches; and (b) a support rod assembly attached to a downstream side of the profile wire assembly and comprising multiple, spaced apart, parallel lengths of support rod oriented substantially orthogonal to the lengths of profile wire, the support rod and support rod assembly having an upstream edge and a downstream edge.

In embodiments, the media support screen with a perforated sheet metal layer described immediately above can further comprise:

(c) a stiffening rod assembly attached to a downstream side of the support rod assembly and comprising multiple, spaced apart, parallel lengths of stiffening rod oriented substantially orthogonal to the lengths of support rod, the stiffening rod and stiffening rod assembly having an upstream edge and a downstream edge.

When the media support screen comprises a perforated sheet metal layer, the support rod and the support rod assembly, and the stiffening rod and the stiffening rod assembly used in embodiments with the perforated sheet metal layer can have the same properties as when they are used with the profile wire assembly.

Figure 5A:
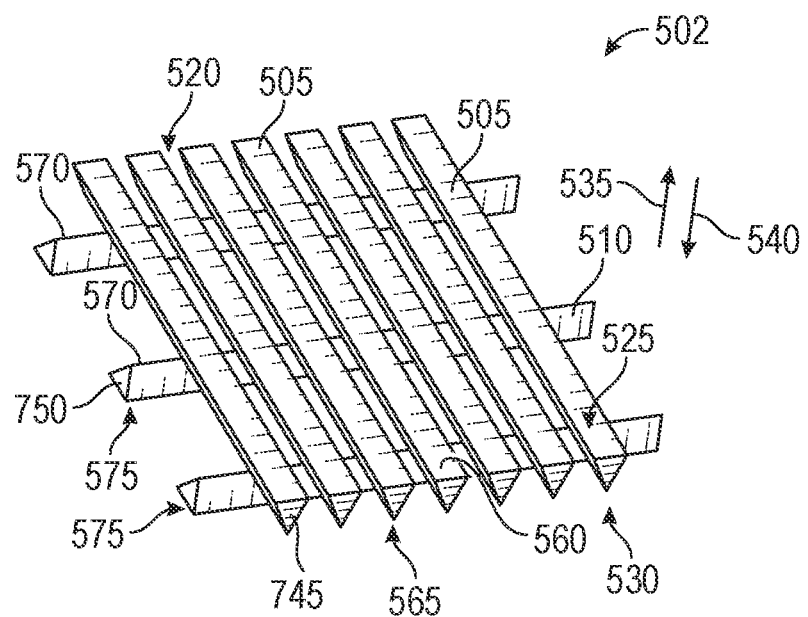
FIG. 5A illustrates an embodiment of a media support screen according to this disclosure, showing a section of the media support screen. Illustrated are the profile wire in the second profile wire assembly having a cross sectional shape which decreases in width in a downstream direction and the support rod in the second support rod assembly having a cross sectional shape which increases in width in the downstream direction. This embodiment does not include the optional stiffening rod that would be assembled in a second stiffening rod assembly and attached to the second support rod assembly.
Figure 5B:
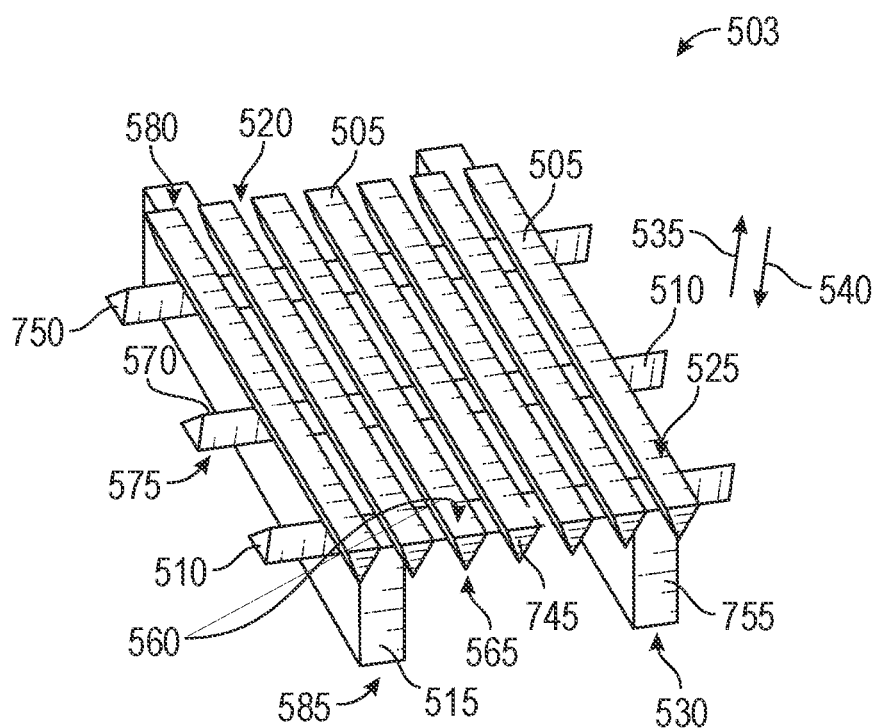
FIG. 5B illustrates an embodiment of a media support screen according to this disclosure, showing a section of the media support screen. Illustrated are the profile wire in the second profile wire assembly having a cross sectional shape which decreases in width in a downstream direction, the support rod in the second support rod assembly having a cross sectional shape which increases in width in the downstream direction. This embodiment also illustrates the optional second stiffening rod assembly and the stiffening rod in the second stiffening rod assembly, attached to a downstream side of the second support rod assembly.

FIG. 5A and FIG. 5B illustrate different embodiments of the media support screen according to this disclosure, each showing a section of the media support screen. FIG. 5A illustrates an embodiment of the media support screen without the optional stiffening rod assembly 502, and FIG. 5B illustrates an embodiment of the media support screen with optional stiffening rod assembly 503.

Illustrated in both FIG. 5A and FIG. 5B are profile wire 505, support rod 510, the slot width between adjacent parallel lengths of profile wire 520, the upstream side of media support screen 525, the downstream side of media support screen 530, and the upstream direction of the media support screen 535 and the downstream direction of the media support screen 540. Both FIG. 5A and FIG. 5B also illustrate the upstream edge of profile wire 560 which corresponds to the upstream side of second profile wire assembly 560, the downstream edge of profile wire 565 which corresponds to the downstream side of second profile wire assembly 565, and the upstream edge of support rod 570 which corresponds to upstream side of second support rod assembly 570, and the downstream edge of support rod 575 which corresponds to the downstream side of second support rod assembly 575. FIG. 5A and FIG. 5B also show the profile wire cross section in media support screen 745 and the support rod cross section in media support screen 750. Thus, in the FIG. 5A and FIG. 5B embodiments, the profile wire 505 has a cross sectional shape 745 which decreases in width in a downstream direction, and the support rod 510 has a cross sectional shape 750 which increases in width in the downstream direction.

FIG. 5B illustrates an embodiment of the media support screen 503 with the optional stiffening rod organized into a stiffening rod assembly in place. In addition to the features listed above, FIG. 5B also illustrates stiffening rod 515, showing the upstream edge of stiffening rod 580 which corresponds to the upstream side of second stiffening rod assembly 580, and the downstream edge of stiffening rod 585 which corresponds to the downstream side of second stiffening rod assembly 585. The stiffening rod cross section in media support screen 755 is also shown in FIG. 5B.

FIG. 5C, FIG. 5D, and FIG. 5E illustrate sections of the media support screen embodiments shown in FIG. 5A and FIG. 5B, in which the FIG. 2A and FIG. 5B media support screens are deconstructed to more clearly show the second profile wire assembly in FIG. 5C, the second support rod assembly in FIG. 5D, and the second stiffening rod assembly in FIG. 5E.

FIG. 5C illustrates a section of the second profile wire assembly 545, and illustrating the upstream edge of the profile wire 560 which corresponds to the upstream side of the second profile wire assembly 560, and the downstream edge of the profile wire 565 which corresponds to the downstream side of second profile wire assembly 565. This drawing further illustrates the slot width between adjacent parallel lengths of profile wire 520 in the second profile wire assembly and further shows the profile wire cross section 745 in the media support screen.

FIG. 5D illustrates a section of the second support rod assembly 550, and illustrating the upstream edge of the support rod 570 which corresponds to the upstream side of the second support rod assembly 570 and the downstream edge of the support rod 575 which corresponds to the downstream side of second support rod assembly 575. This drawing further illustrates the center-to-center distance between adjacent parallel lengths of support rod 735 in the second support rod assembly and further shows the support rod cross section 750 in the media support screen.

FIG. 5E illustrates a section of the second stiffening rod assembly 555, and illustrating the upstream edge of the stiffening rod 580 which corresponds to the upstream side of the second stiffening rod assembly 580, and the downstream edge of the stiffening rod 585 which corresponds to the downstream side of second stiffening rod assembly 585. This drawing further illustrates the center-to-center distance between adjacent parallel lengths of stiffening rod 740 in the second stiffening rod assembly and further shows the stiffening rod cross section 755 in the media support screen.

Figure 6A:
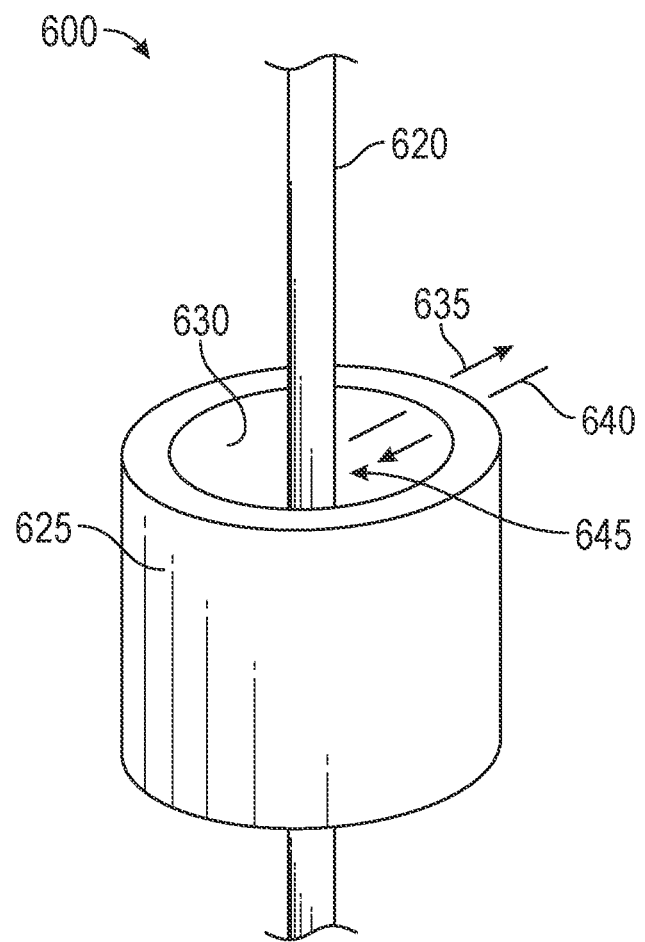
FIG. 6A illustrates an embodiment of the backwash filter screen of this disclosure similar to the FIG. 3A embodiment, but in FIG. 6A the backwash filter screen is provided as a cylindrical shape without the use of modular sections. A portion of the drive element to which an impeller is attached is also illustrated, and the upstream side of backwash filter screen, the downstream side of backwash filter screen, the upstream direction of backwash filter screen, and the downstream direction of backwash filter screen are also shown.

FIG. 6A illustrates an embodiment of the backwash filter screen which is similar to the FIG. 3A embodiment, but in FIG. 6A the backwash filter screen 600 is provided as a cylindrical shape without the use of modular sections. FIG. 6A illustrates a portion of the drive element 620 to which an impeller is attached and which rotates the impeller about an axis to disperse the granular filtration media within a liquid during the backwash cycle, which is also shown in FIG. 4. FIG. 6A also shows the upstream side of backwash filter screen 625, the downstream side of backwash filter screen 630, the upstream direction of backwash filter screen 635, the downstream direction of backwash filter screen 640, and the annular cross section of the backwash filter screen 645.

Figure 6B:
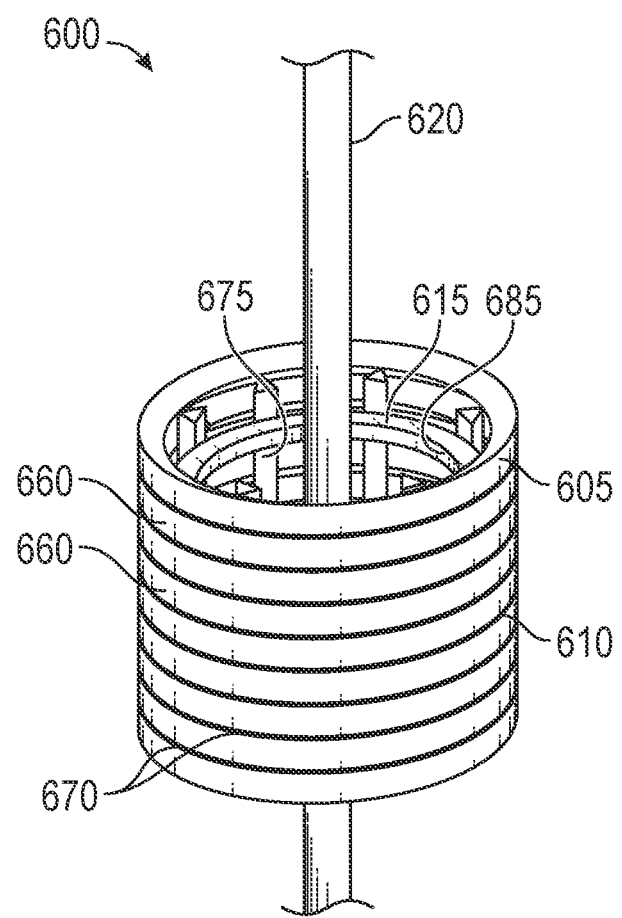
FIG. 6B illustrates an embodiment of a backwash filter screen of this disclosure similar to the embodiment of FIG. 3B, but in FIG. 6B the backwash filter screen is formed into a cylindrical shape without the use of modular sections. The implementation of this shaped backwash filter screen in a backwash filter unit is also shown in FIG. 4.

FIG. 6B illustrates an embodiment of a backwash filter screen of this disclosure similar to the embodiment of FIG. 3B, but in FIG. 6B the backwash filter screen is formed into a cylindrical shape without the use of modular sections. The implementation of this shaped backwash filter screen in a backwash filter unit is shown in FIG. 4. FIG. 6B shows the profile wire 605, the support rod 610 visible in the gap between the profile wire, and the stiffening rod 615. Also seen FIG. 6B are the upstream edge of profile wire 660 which corresponds to the upstream side of the first profile wire assembly 660, a portion of the upstream edge of support rod 670 which corresponds to the upstream side of the first support rod assembly 670 and which is seen in the space between adjacent lengths of profile wire, the downstream edge of support rod 675 which corresponds to the downstream side of first support rod assembly 675, stiffening rod 615 and the downstream edge of stiffening rod 685 which corresponds to the downstream side of first stiffening rod assembly 685. A portion of the drive element 620 to which an impeller is attached and which rotates the impeller about an axis to disperse the granular filtration media within a liquid during the backwash cycle, which is also shown in FIG. 4.

Figure 7:
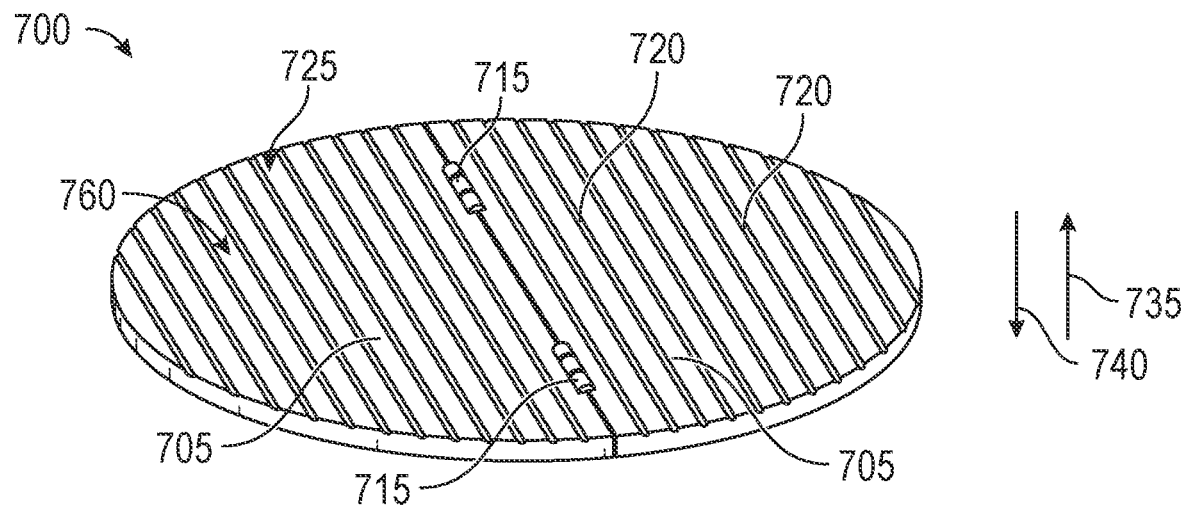
FIG. 7 illustrates an embodiment of the media support screen of this disclosure, showing perspective drawing of the media support screen in which the upstream side of the media support screen and the upstream edge of the second profile wire and upstream side of the second profile wire assembly can be seen. In this embodiment, the media support screen is seen to be formed into two modular sections which are connected with hinges, and configured to allow folding of the media support screen into a collapsed configuration for insertion within a filter tank of a backwashable granular media bed filtration system and subsequently unfolded for securing inside the tank.

FIG. 7 illustrates an embodiment of the media support screen 600 of this disclosure, showing perspective drawing of the media support screen in which the upstream side of media support the screen 625 and the upstream edge of the second profile wire and upstream side of the second profile wire assembly 660 are seen. Also shown in this figure are the second profile wire 605 and the slot between adjacent parallel lengths of second profile wire 620, and the upstream direction of media support screen 635 and the downstream direction of media support screen 640 are also designated. In this embodiment, the media support screen 600 is seen to be formed into two modular sections which are connected with hinges 615, and configured to allow folding of the media support screen 600 into a collapsed configuration for insertion within a filter tank of a backwashable granular media bed filtration system and subsequently unfolded for securing inside the tank of a backwashable filter unit. FIG. 6 is illustrative only of an embodiment, showing how the media support screen can be hinged for folding, and there is no significance to the number of profile wires or hinges are used to illustrate the embodiment of FIG. 6.

The perforations in the perforated sheet metal layer can be in the shape of a circle, a polygon, a triangle, a square, a rectangle, a rounded-end rectangle, a hexagon, an ellipse, a diamond, or any combination thereof. In an aspect, the perforations can have an average size (major axis) of from about 0.008 to about 0.0012 inches. Alternatively, the perforations can have an average size (major axis) of from about 0.009 to about 0.0011 inches. According to another aspect, the perforations can have an average size (major axis) of about 0.008 inches, about 0.009 inches, about 0.010 inches, about 0.011 inches, or about 0.0012 inches, or any range between any of these values.

In a further aspect, the open (perforated) area of the perforated sheet metal layer can be from about 15% to about 35% of the total area of the sheet metal layer including the perforations. The open or perforated area can be adjusted by the size of the perforations and their density of coverage. Alternatively, the open (perforated) area of the perforated sheet metal layer can be about 15%, about 20%, about 25%, about 30%, or about 35% of the total area of the sheet metal layer including the perforations, or any range between any of these values.

Retrofit Kit. The backwash filter screen, the media support filter screen, or both can be provided as a retrofit or "drop-in" kit that can be used to replace the original or existing backwash filter screen, media support filter screen, or both of an existing filtration unit. In an aspect, the backwash filter screen, the media support filter screen, or both can comprise a shape and size equivalent to, or a shape and size sufficient to retrofit, an original or existing backwash media support filter screen of any commercial HYDROMATION® filter.

Therefore, in an aspect, this disclosure provides a retrofit kit for a backwashable granular media bed filtration system, the kit comprising a backwash filter screen, a media support screen, or both a backwash filter screen and a media support screen. The retrofit kit may also further comprise a backwashable filter impeller having vanes, wherein at least a portion of the impeller vane surfaces is coated with an abrasion resistant material. The impeller can comprise a shape and size suitable to retrofit an original impeller of a commercial agitator-based backwashing nut shell media filter.

Backwash filter impellers are configured to attach to a drive element which rotates the impeller about an axis and disperses the granular filtration media within the liquid in a filtration tank during the backwash cycle. By coating the impeller or a portion of the impeller with an abrasion resistant material, the life of the impeller can be extended and replacement or repair costs avoided or delayed. For example, at least a portion of the impeller vane surfaces can be coated with an abrasion resistant material comprising or selected from rubber. At least a portion of the impeller vane surfaces can be coated with an abrasion resistant material having an ASTM D2240 type A Shore hardness of 40 or greater. Alternatively, at least a portion of the impeller vane surfaces can be coated with an abrasion resistant material having an ASTM D2240 type A Shore hardness of 50 or greater. At least a portion of the impeller vane surfaces can be coated with an abrasion resistant material having an ASTM D2240 type A Shore hardness of from 40 to 75. For example, the an abrasion resistant material can have an ASTM D2240 type A Shore hardness of about 40, about 45, about 50, about 55, about 60, about 65, about 70, or about 75, including any ranges between any of these values.

The abrasion resistant material can be a fluoroelastomer as defined in ASTM D1418, and at least a portion of the impeller vane surfaces can be coated with the fluoroelastomer. At least a portion of the impeller vane surfaces can be coated with: silicone; Buna-N rubber (NBR); ethylene propylene diene monomer rubber (EPDM); a fluoroelastomer; an FKM fluoroelastomer; VITION®; a copolymer of hexafluoropropylene (HFP) and vinylidene fluoride (VDF or VF2); a terpolymer of tetrafluoroethylene (TFE), vinylidene fluoride (VDF) and hexafluoropropylene (HFP); a perfluoromethylvinylether (PMVE)-containing elastomer; neoprene rubber; gum rubber; styrene-butadiene rubber (SBR); or urethane rubber. In an aspect, at least a portion of the impeller vane surfaces can be coated with Buna-N rubber to a thickness of about ⅛ inch. The thickness of the Buna-N rubber can be about ±5%, ±10%, or +15% of this thickness of about ⅛ inch.

The impeller comprises a shape and size equivalent to an original impeller of a HYDROMATION® filter or a shape and size to retrofit an original impeller of a HYDROMATION® filter. For example, just as with the backwash filter screen and the media support screen, the impeller can comprise a shape and size equivalent to, or shape and size to retrofit a HYDROMATION® filter Model Number FDB-7P, FDB-12P, FDB-19P, FDB-28P, FDB-39P, FDB-50P, FDB-64P, FDB-78P, FDB-95P, FDB-113P, FDB-133P, FDB-122P, FDB-162P, FDB-170P, FDB-243P, FDB-324P, FDB-340P, FDB-405P, or FDB-486P.

Complete Filtration System. While the backwash filter screen, media support screen, and coated impeller are described herein in detail, this disclosure also provides a complete backwashable filtration system or unit for filtering or separating oil, particulates, and oily particulates from water. In an aspect, there is provided a backwashable granular media bed filtration system, the system comprising:

(a) a filter tank for containing a liquid and having [1] an internal space adapted to receive a contaminated liquid. [2] a first filter inlet adapted to direct a contaminated liquid into the filter tank, and [3] a first filter outlet adapted to direct a filtered liquid out of the filter tank;
(b) a media support screen extending horizontally across a cross-section of the tank and having a top and a bottom, wherein the first filter inlet is upstream of the media support screen, and the first filter outlet is downstream of the media support screen;
(c) a granular filtration media positioned within the filter tank upstream of the media support screen and which rests on top of the media support screen during a filtration cycle; and
(d) a backwash agitator assembly, comprising: [1] an impeller having vanes positioned within the internal space of the tank and adapted to disperse the filtration media within the liquid contained in the tank, wherein at least a portion of the impeller vane surfaces is coated with an abrasion resistant material; [2] a periodically-operated drive element adapted to rotate the impeller about an axis and disperse the filtration media within a backwash liquid during a backwash cycle; [3] a backwash filter screen as disclosed herein upstream of the media support screen having openings formed therein which are sized to prevent passage of the granular filtration media therethrough during the backwash cycle, and [4] a second filter outlet adapted to receive the backwash liquid after passage through the backwash filter screen during the backwash cycle and direct the backwash liquid out of the filter tank.

In this aspect, the media support screen can also be a media support screen as disclosed herein.

In another aspect, depending upon the shape and design of the backwashable granular media bed filtration system, the backwash filter screen can comprise a shape and size equivalent to, or a shape and size suitable to retrofit, an original backwash filter screen of a HYDROMATION® filter Model Number FDB-7P, FDB-12P, FDB-19P, FDB-28P, FDB-39P, FDB-50P, FDB-64P, FDB-78P, FDB-95P, FDB-113P, FDB-133P, FDB-122P, FDB-162P, FDB-170P, FDB-243P, FDB-324P, FDB-340P, FDB-405P, or FDB-486P.

Definitions and Additional Disclosure

To define more clearly the terms used herein, the following definitions are provided, and unless otherwise indicated or the context requires otherwise, these definitions are applicable throughout this disclosure. If a term is used in this disclosure but is not specifically defined herein, the definition from the IUPAC Compendium of Chemical Terminology, $2^{nd}$ Ed (1997) can be applied, as long as that definition does not conflict with any other disclosure or definition applied herein, or render indefinite or non-enabled any claim to which that definition is applied.

The disclosures of various publications that may be referenced throughout this specification, which are hereby incorporated by reference in pertinent part in order to more fully describe the state of the art to which the disclosed subject matter pertains. To the extent that any definition or usage provided by any document incorporated herein by reference conflicts with the definition or usage provided herein, the definition or usage provided herein controls.

For any particular compound disclosed herein, the general structure presented is also intended to encompasses all conformational isomers and stereoisomers that can arise from a particular set of substituents, unless indicated otherwise or the context provides otherwise. Thus, the general structure encompasses all enantiomers, diastereomers, and other optical isomers whether in enantiomeric or racemic forms, as well as mixtures of stereoisomers, as the context permits or requires. Accordingly, Applicant reserves the right to proviso out any particular individual isomer or isomers, if for any reason Applicant chooses to claim less than the full measure of the disclosure, for example, to account for a reference that Applicant is unaware of at the time of the filing of the application.

Throughout the specification and claims, the word "comprise" and variations of the word, such as "comprising" and "comprises," means "including but not limited to," and is not intended to exclude, for example, other additives, components, elements, or steps. While methods and features are described in terms of "comprising" various steps or components, these methods and features can also "consist essentially of" or "consist of" the various steps or components. Therefore, by the disclosure that a composition, a method, and the like "comprises" one or more elements or steps, Applicant also intends to disclose that the composition, the method, and the zlike may also "consist essentially of" or "consist of" the recited elements or steps.

As used in the specification and the claims, the singular forms "a," "an," and "the" include plural referents unless the context clearly indicates otherwise. Thus, for example, reference to "a compound" includes mixtures of two or more such compounds, reference to "the composition" includes mixtures of two or more such compositions, and the like.

"Optional" or "optionally" means that the subsequently described event or circumstance can or cannot occur, and that the description includes instances where the event or circumstance occurs and instances where it does not.

For the purposes of describing and defining the present teachings, the term "substantially" is utilized to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue. For example, in an aspect, when quantifiable and applicable, the term "substantially" can mean greater than 50% of the recited feature, greater than or equal to 60% of the recited feature, greater than or equal to 70% of the recited feature, greater than or equal to 75% of the recited feature, greater than or equal to 80% of the recited feature, greater than or equal to 85% of the recited feature, greater than or equal to 90% of the recited feature, greater than or equal to 95% of the recited feature, greater than or equal to 97% of the recited feature, or greater than or equal to 98% of the recited feature, greater than or equal to 99% of the recited feature, greater than or equal to 99.5% of the recited feature, or 100% of the recited feature. For example, by describing the parallel lengths of support rod as being oriented "substantially" orthogonal to the lengths of profile wire in the profile wire assembly, the applicant's intent is to disclose that angle between the support rod and the profile wire is more than 50% of the angle traversed when the support rod is turned from a parallel orientation (0°) and a perpendicular orientation (90°). Therefore, the smaller angle between the support rod and profile wire orientation can be greater than 45°, because "substantially" can mean greater than 50% of the recited feature. In this aspect, "substantially" orthogonal can also mean the smaller angle between the support rod and profile wire orientation can be greater than 54° (greater than 60% of the recited feature), greater than 63° (greater than 70% of the recited feature), and so on, up to 90° or 100% of the recited feature. In one aspect, "substantially" orthogonal can mean that the smaller angle between the support rod and profile wire orientation can be greater than 45°, greater than or about 50°, greater than or about 55°, greater than or about 60°, greater than or about 65°, greater than or about 70°, greater than or about 75°, greater than or about 80°, greater than or about 85°, or about 90°.

Unless indicated otherwise, when a range of any type is disclosed or claimed, for example a range of the percentages, crush strengths, conversions or reaction rates, and the like, it is intended to disclose or claim individually each possible number that such a range could reasonably encompass, including any sub-ranges or combinations of sub-ranges encompassed therein. For example, when describing a range of percentages such as from 85% to 95%, it is understood that this disclosure is intended to encompass each of 85%, 86%, 87%, 88%, 89%, 90%, 91%, 92%, 93%, 94%, and 95%, as well as any ranges, sub-ranges, and combinations of sub-ranges encompassed therein. Applicant's intent is that these two methods of describing the range are interchangeable. Accordingly, Applicant reserves the right to proviso out or exclude any individual members of any such group, including any sub-ranges or combinations of sub-ranges within the group, if for any reason Applicant chooses to claim less than the full measure of the disclosure, for example, to account for a reference that Applicant is unaware of at the time of the filing of the application.

Values or ranges may be expressed herein as "about", from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed herein, and that each value is also herein disclosed as "about" that particular value in addition to the value itself. In aspects, "about" can be used to mean within 10% of the recited value, within 5% of the recited value, within 2% of the recited value, or within 1% of the recited value.

Any headings that are employed herein are not intended to be used to construe the scope of the claims or to limit the scope of the subject matter that is disclosed herein. Any use of the past tense to describe an example otherwise indicated as constructive or prophetic is not intended to reflect that the constructive or prophetic example has actually been carried out.

These and other aspects are further provided in the Examples and Aspects of the Disclosure which follow.

EXAMPLES

Any use of the past tense to describe an example otherwise indicated or understood as constructive or prophetic is not intended to reflect that the constructive or prophetic example has actually been carried out. Applicant further reserve the right to proviso out any selection, feature, range, element, or aspect, for example, to limit the scope of any claim to account for a prior disclosure of which Applicant may be unaware, or if the Applicant elects to claim less than the full scope of the disclosed subject matter.

Mesh sizes described in the Examples and throughout the application refer to standard U.S. mesh sizes.

Properties of the RE-GEN® Filtration Media and Comparison to Conventional Nutshell Filtration Media The RE-GEN® filtration media, available commercially from MyCelx Technologies Corporation, was initially selected for use in a backwashable filtration device because, among other reasons, the shape and packing efficiency of RE-GEN® suggested that its performance would be superior to nutshell media. However, when testing RE-GEN® media particles in conventional nutshell filtration units, it was unexpectedly discovered that its flaky particle shape with a high length-to-width ratio and a small depth led to problems beyond those based on the size of the particles.

While developing backwash and media support filtration screens for the RE-GEN® media particles, it was also unexpected discovered that the shape factor of the RE-GEN® zeolite particles, namely the angular, non-spherical particle shapes, provided unique and beneficial features which assisted with the filtration. Firstly, the asymmetric RE-GEN® particles pack together very efficiently when settled, which provides a media bed which has low porosity. This resulting low porosity requires a contaminant particle to travel a very tortuous path through the media bed, which increases the probability of its interception. Secondly, it was unexpectedly discovered that the RE-GEN® particle surface morphology results in the media particles "locking" together, in a way which unexpectedly allows the filtration process to be run at higher bed differential pressures, allowing increasing amounts of particulate to be loaded onto the bed, which translates into a longer run life before a backwash cycle is required. That is, when bed differential pressure is increased, the RE-GEN® particles become even more tightly locked and capable of withstanding the higher pressures. In contrast, increasing bed differential pressures using conventional and more smooth-surfaced filtration media can lead to problems in bed fracture, where the pressure creates a large fracture in the bed and allows the contaminated water to rush through without the contaminants being intercepted by the bed. This second, particle locking feature is different from and in addition to the high packing efficiency described above.

While the Applicant does not intend to be bound by theory, it appears that the highly efficient packing of the RE-GEN® particles may arise from their flaky and asymmetric shape in which a typical particle has a high length-to-width ratio and a significantly smaller depth, which allows them to pack very well. The particle locking feature appears to arise from both from the macro-(shape) and micro-scale (surface roughness) properties of the particles, for example, the stepped micro-scale surface of the particles which locks against the stepped surface of an opposing particle.

RE-GEN® Performance with Conventional Screen Systems

Initial filtration testing using the RE-GEN® particles was carried out with existing screen systems, that is, backwash and media support screens of the type used with conventional nutshell media, which were merely sized according to the average size of the RE-GEN® media particles. The calculated size profile of the RE-GEN® media was approximately 12×40 mesh, as >95% of the media mass passes through 12 mesh, and >95% of the media mass is retained on 40 mesh. Mesh refers to test sieving using square (X=Y) wire mesh sieves as per ASTM E11, and is the typical sizing criterial for granular materials after being mined and crushed.

On the basis of these size measurements and using the standard protocol for selecting the size of a wedge wire screen, the smaller 40 mesh slot size was initially selected as the equivalent slot size in a wedge wire system and tested in a backwash filter screen. However, this backwash filter screen performed poorly, as approximately 40% of the RE-GEN® filtration media was lost through the filter screens over six months of operation of the filtration unit, and severe plugging of the screens leading to poor system flow capacity resulted. For example, the downstream strainer which functions to protect a pump became severely clogged with the finest media particles. Among other things, these tests demonstrated the RE-GEN® shape is a factor in selecting screens, and also how square mesh size connoted for aggregate manufacturers does not necessarily translate to wedge wire for filter screens used by equipment engineers, in the case of an unusually-shaped filtration media.

An illustration of the shape factor for the RE-GEN® media is illustrated in FIG. 1 which shows a representative sharp-profiled and non-spherical shape of a typical RE-GEN® media particle 100. These particles can be seen to display asymmetry and dissimilar length, width, and depth measurements and which resemble a very "flaky" or angular structure having a high length-to-width (L/W) ratio and relatively small depth (D) or thickness which is substantially smaller than either the length of width. Thus, the particle shape is similar to the shape of a book, a slab of sidewalk concrete, or a grave marker with obvious asymmetry. Thus, for a typical RE-GEN® particle, length is greater than width, which is much greater than depth (L>W>>D). In contrast, a representative shape of a typical walnut shell filtration media particle, which displays greater symmetry than RE-GEN®, and similar length, width, and depth measurements. In the walnut shell media, the length-to-width (L/W) ratio approximately 1, leading to a high circularity and low angularity of the particles. Therefore, in the walnut shell media, the length-to-width (L/W) ratio approximately 1, leading to a high circularity and low angularity of the particles, and the overall length (L), width (W), and depth (D) are such that L≈W≈D.

The 40 mesh initially tested was a square wire mesh, which is a metal weaved cloth in a square pattern of the type used for sieving and grading aggregate materials. A 40 mesh square wire has openings which are 0.420 mm on each side. The size profile of the RE-GEN® particles were also determined by sieving using SI Unit (millimeter) square wire sieves. This SI sieve test provided a typical size profile for the RE-GEN® material of approximately 0.42 mm to 1.2 mm. That is, >95% of the media mass passed through a 1.2 mm sieve, and >95% of the media mass was retained on a 0.42 mm sieve. Therefore, according to the industry standard method of reporting, the size profile of the RE-GEN® is therefore nominally 0.42 mm to 1.2 mm.

It was discovered that for highly asymmetric media such as RE-GEN®, the square wire mesh size or sieve size needed for particle retention did not directly translate to a wedge wire spacing when using a wedge wire filter screen.

The parallel wires of a wedge wire screen, as used in a backwash or media support screens, use wedge wire arrayed in a slot form, as described herein. For example, although a wedge wire screen may use a 0.420 mm slot dimension on the y-axis (corresponding with the particle thickness or depth), the x-axis of a wedge wire screen can typically be from about 10× (ten times) to about 20× (20 times) this dimension, which is a function of the support rod spacing downstream of the wedge wire. As a result, a rectangular opening is available at the upstream edge of a backwash filter screen which has an approximate dimensions of 4.2 mm×0.42 mm sides. This opening is still capable of rejecting a typical spherical particle such as a nutshell media particle having all dimensions being nearly equivalent and being greater than about 0.42 mm. However with RE-GEN® particles in which the dimensions X>Y>>Z, the planar particle can arrange itself to either slip through the wedge wire slot completely, or lodge into the slot with the slim angular portion inside the wedge, and subsequently either break off under pressure and abrasion, or simply clog the path. This undesirable result then, is a feature of using a planar particle and asymmetric media such as RE-GEN® with screens designed using a protocol that is applicable to substantially spherical media such as nutshell media.

Examples 1-6. Screen Systems Design Approach for the RE-GEN® Media

As a result of the problems and failures explained above, testing was carried out to develop a translation method which could convert a conventionally selected square sieve mesh size to a slot size for a wedge wire screen design, based on the RE-GEN® particle size and shape. Table 1 illustrates how the planar and asymmetric RE-GEN® media, which was initially screened in various sieving processes square wire mesh, performed through a wedge wire test screen.

A bulk amount of REGEN (0.42 mm to 1.2 mm) was screened into two split sections for testing, centered at 0.960 mm or 960 microns (μm), referred to as −960 and +960. Samples listed as retained from a #18 screen (Example 1) or a #20 screen (Example 2) are commercial RE-GEN® samples which were retained on the respective sieve prior to using that sample in the listed test method with the wedge wire screen described. The RE-GEN® sample listed as being-960 μm screened (Example 3) was nominally <960 microns (μm) and the +960 μm screened (Example 3) was nominally ≥960 microns (μm), that is, these samples either passed through (−960 μm) or were retained (+960 μm) on a 960 μm screen. Samples listed as "standard RE-GEN®" were not initially sieved.

To minimize instrumental variations, the initial RE-GEN® sample weight was determined from the difference between an average of three weight measurements on a single container and an average of three weight measurements on the container plus the initially screened RE-GEN® sample. The weight of the wedge wire screen was also determined as an average of three weight measurements. The retained sample weight was determined from the difference between the average wedge wire weight and the average of three weight measurements on wedge wire plus the RE-GEN® sample following shaking as described. The wedge wire sample was adapted into the shaker table tray of a Gilson sieve shaker, and the shaker was run for 10 minutes. The retention data of Example 2 compares Gilson shaker table data with a sample that was shaken by hand for 10 minutes, illustrating the similarity of these data.

In an aspect, one desired set point or target for the minimum percentage of the media which to be retained on the wedge wire screen was 97% following the shaking test, that is, passing less than 3% through the wedge wire screen upon the shaking test. The test screens used for the Table 1 data were either a #40 mesh (Examples 1-4) or a #60 mesh (Example 5) wedge wire test screen, with Example 6 being a perforated screen. The #60 mesh wedge wire screen had a slot size of 0.010" (+0.002"), supported by #130 support rod with a screen wire of #30 wrap wire. The #40 mesh wedge wire screen was similar but had a slot size of 0.0165" (+0.002"). The perforated screen of Example 6 comprised 0.015" round perforations with 0.045" between staggered centers (0.015"×0.045").

The data from Examples 1~4 illustrate that, even though on the basis of the average RE-GEN® particle size and the corresponding square sieve size measurements the skilled person might expect a wedge wire filter screen having a #40 mesh slot size would perform well, this wedge wire screen performed poorly in the simple shaking tests. As described herein, this poor performance was observed under backwashing conditions where approximately 40% of the RE-GEN® filtration media was lost through the filter screens over six months of operation of the filtration unit.

TABLE 1

Retention data for RE-GEN® media

| | Example | | | | | |
|---|---|---|---|---|---|---|
| | 1 | 2 | 3 | 4 | 5 | 6 |
| RE-GEN® media sample | Retained from #18 sieve | Retained from #20 sieve | Screened RE-GEN® (−960 μm) | Screened RE-GEN® (+960 μm) | Standard RE-GEN® | Standard RE-GEN® |
| Wedge wire test screen | #40 mesh wedge wire screen | #40 mesh wedge wire screen | #40 mesh wedge wire screen | #40 mesh wedge wire screen | #60 mesh wedge wire screen | Perforated screen (0.015" Rd. × 0.045" Stag. Ctrs.) |
| Test method | Shaker table for 10 minutes | A) Hand shake for 10 minutes B) Shaker table for 10 minutes | Shaker table for 10 minutes | Shaker table for 10 minutes | Shaker table for 10 minutes | Hand shake for 10 minutes |
| Initial sample wt, g | 99.97 | A) 100.02 B) 100.02 | 100.09 | 100.00 | 100.00 | 499.97 |
| Retained sample wt, g | 96.26 | A) 93.04 B) 92.62 | 50.43 | 94.38 | 98.52 | 495.68 |

TABLE 1-continued

Retention data for RE-GEN® media

| | Example | | | | | |
|---|---|---|---|---|---|---|
| | 1 | 2 | 3 | 4 | 5 | 6 |
| Passed sample wt (Δ wt), g | 3.71 | A) 6.98<br>B) 7.40 | 49.66 | 5.62 | 1.48 | 4.29 |
| Percent (%) passed | 3.71% | A) 6.97%<br>B) 7.40% | 49.61% | 5.62% | 1.48% | 0.86% |

This testing revealed the selection of suitable slot size for wedge wire mesh, the shape of which imparts strength and the ability to withstand backwashing pressures, is around that of the #60 mesh wedge wire screen having a slot size of 0.010". As explained in detail elsewhere in this disclosure, slot sizes slightly greater and slightly less than 0.010" also work. One effect of reducing the slot size as described was that the total slot area or total "open" area of the slots goes down for the same surface area of a filter screen. This effect was overcome in a backwash filter screen by using a smaller wedge wire wrap, that is, a more narrow wire which imparted more slots per inch to the filter. While addressing the slot area issue, this solution in turn led to the unexpected feature of making a weaker screen overall due to the smaller wire, which increased the risk that the screen would be unable to withstand the required backpressures for operation of the backwashable filtration unit. In this aspect, the innovation of using stiffening rings in the backwash filter was developed, as described hereinabove.

While not intending to be theory-bound, because the RE-GEN® filtration media is being used in a system in which the media will be abrading itself, particularly during backwashing, it is possible that when larger granules of media hit each other they may fracture which can create smaller particles or granules. In an aspect, it is possible that these smaller granules result may be of a size which can embed or stick in a backwash filter screen. However, various mechanisms may assist in clearing the screen. For example when the backwash filter screen is of the type which rotates during backwashing, rotational motion and the resulting centrifugal force can lift the particle off the screen to aid in clearing such blockages. Further, the abrasive power of the media slurry acting along the face of the wire screen when it is agitated and backwashed may operate to physically impact and remove particles which are sticking and blocking the screen surface.

However, in one aspect, additional anti-plugging mechanisms may be used to assist in preventing blocking or plugging, or to assist in removal of particles which block the screen. In one aspect, increasing the surface area of the slots (open area) can improve backwashing and help prevent or reduce plugging and blockage. For example, one goal may be to build a cylindrical backwashing filtration screen which can stay below 12 ft/sec approach velocity on the screen surface with even 90% of the open area plugged, and still meet the minimum flow required for cleaning the bed (12 gpm/ft2 bed area). In this aspect, the sizing of the backwash filter screen, as informed by such considerations, may be increased as described herein, with the only limitation being the vessel manway opening diameter for retrofitting the oversized filtration screen. For example, if the conventional screen diameter screen is 24 inches and the new target screen is 26 inches, the backwash filter screen can be formed into multiple modular sections (for example, two, three, or four) for assembly within a filter tank of a backwashable granular media bed filtration system. In an aspect, one design effectively splits the screen vertically into two halves, which be inserted individually into the vessel and assembled therein.

These and other features, advantages, examples, and embodiments of the invention disclosed herein will be readily apparent to those exercising ordinary skill after reading the foregoing disclosures and the following Aspects of the Disclosure. Accordingly, while specific embodiments and aspects of the invention are described in considerable detail, variations and modifications of those embodiments and aspects can be effected without departing from the spirit and scope of the invention as claimed.

ASPECTS OF THE DISCLOSURE

Aspect 1. A retrofit kit for a backwashable granular media bed filtration system, the kit comprising a backwash filter screen, wherein the backwash filter screen comprises, in series from an upstream side to a downstream side during a backwash cycle:
 (a) a first profile wire assembly comprising:
  [1] multiple, spaced apart, parallel lengths of profile wire having an upstream edge and a downstream edge, wherein upstream edges of the profile wire and spaces therebetween define an upstream side of the first profile wire assembly;
  [2] a profile wire cross sectional shape which decreases in width in a downstream direction from the upstream edge which is wider than a downstream edge;
  [3] a space between adjacent parallel lengths of profile wire (slot width) at the upstream edges of the profile wire of from 0.007 inches to 0.013 inches; and
  [4] a width of the upstream edge of the profile wire which provides a total space area (slot area) of from 20% to 30% of the total area of the upstream side of the first profile wire assembly;
 (b) a first support rod assembly attached to a downstream side of the first profile wire assembly and comprising multiple, spaced apart, parallel lengths of support rod oriented substantially orthogonal to the lengths of profile wire, the support rod and the first support rod assembly having an upstream edge and a downstream edge; and
 (c) a first stiffening rod assembly attached to a downstream side of the first support rod assembly and comprising multiple, spaced apart, parallel lengths of stiffening rod oriented substantially orthogonal to the lengths of support rod, the stiffening rod and the first stiffening rod assembly having an upstream edge and a downstream edge.

Aspect 2. The retrofit kit according to Aspect 1, wherein the backwash filter screen comprises an cylindrical shape having an annular cross section with an outer surface and an inner surface, and having an interior space adapted to allow a backwash liquid to pass from the exterior of the backwash filter screen into the internal annular space during the backwash cycle.

Aspect 3. The retrofit kit according to Aspect 2, wherein the parallel lengths of profile wire in the first profile wire assembly are formed into circumferential rings at the outer surface of the annular cross section.

Aspect 4. The retrofit kit according to any one of Aspects 2-3, the parallel lengths of support rod in the first support rod assembly are oriented parallel to the length of the cylindrical shape substantially orthogonal to the lengths of profile wire.

Aspect 5. The retrofit kit according to any one of Aspects 2-4, wherein the parallel lengths of stiffening rod in the first stiffening ring assembly are formed into circumferential rings at the inner surface of the annular cross section.

Aspect 6. The retrofit kit according to any one of Aspects 1-5, wherein the space between adjacent parallel lengths of profile wire (slot width) in the first profile wire assembly at the upstream edge of the profile wire is from 0.008 inches to 0.012 inches or alternatively, from 0.009 inches to 0.011 inches.

Aspect 7. The retrofit kit according to any one of Aspects 1-5, wherein the space between adjacent parallel lengths of profile wire (slot width) in the first profile wire assembly at the upstream edge of the profile wire is 0.010 inches or about 0.010 inches.

Aspect 8. The retrofit kit according to any one of Aspects 1-7, wherein the width of the upstream edge of the profile wire in the first profile wire assembly provides a total space area (slot area) of from 22% to 28% of the total area of the upstream side of the first profile wire assembly.

Aspect 9. The retrofit kit according to any one of Aspects 1-7, wherein the width of the upstream edge of the profile wire in the first profile wire assembly provides a total space area (slot area) of 25% or about 25% of the total area of the upstream side of the first profile wire assembly.

Aspect 10. The retrofit kit according to any one of Aspects 1-9, wherein the upstream edge of the profile wire in the first profile wire assembly has a width of from 0.025 inches to 0.035 inches.

Aspect 11. The retrofit kit according to any one of Aspects 1-9, wherein the upstream edge of the profile wire in the first profile wire assembly has a width of from 0.028 inches to 0.032 inches.

Aspect 12. The retrofit kit according to any one of Aspects 1-9, wherein the upstream edge of the profile wire in the first profile wire assembly has a width of 0.030 inches or about 0.030 inches.

Aspect 13. The retrofit kit according to any one of Aspects 1-12, wherein the profile wire in the first profile wire assembly comprises size 30 profile rod.

Aspect 14. The retrofit kit according to any one of Aspects 1-13, wherein the profile wire in the first profile wire assembly has a cross sectional shape selected from polygonal, triangular, truncated triangular, truncated triangular with a rounded upstream edge, trapezoidal, trapezoidal with a rounded upstream edge, quadrilateral, semicircular, or T-shaped.

Aspect 15. The retrofit kit according to any one of Aspects 1-14, wherein the profile wire in the first profile wire assembly comprises stainless steel.

Aspect 16. The retrofit kit according to any one of Aspects 1-15, wherein the backwash filter screen is formed into two, three, or four modular sections for assembly within a filter tank of a backwashable granular media bed filtration system.

Aspect 17. The retrofit kit according to any one of Aspects 1-15, wherein the backwash filter screen is formed into two modular sections.

Aspect 18. The retrofit kit according to any one of Aspects 1-17, wherein the backwash filter screen comprises a shape and size to retrofit an original backwash filter screen of a commercial agitator based backwashing nut shell media filter.

Aspect 19. The retrofit kit according to any one of Aspects 1-18, wherein the backwash filter screen comprises a shape and size equivalent to an original backwash filter screen of a HYDROMATION® filter Model Number FDB-7P, FDB-12P, FDB-19P, FDB-28P, FDB-39P, FDB-50P, FDB-64P, FDB-78P, FDB-95P, FDB-113P, FDB-133P, FDB-122P, FDB-162P, FDB-170P, FDB-243P, FDB-324P, FDB-340P, FDB-405P, or FDB-486P.

Aspect 20. The retrofit kit according to any one of Aspects 1-19, wherein the backwash filter screen comprises a shape and size to retrofit an original backwash filter screen of a HYDROMATION® filter Model Number FDB-7P, FDB-12P, FDB-19P, FDB-28P, FDB-39P, FDB-50P, FDB-64P, FDB-78P, FDB-95P, FDB-113P, FDB-133P, FDB-122P, FDB-162P, FDB-170P, FDB-243P, FDB-324P, FDB-340P, FDB-405P, or FDB-486P.

Aspect 21. The retrofit kit according to Aspect 20, wherein the backwash filter screen comprises an open cylindrical shape having an annular cross section and an outer diameter (OD) which is from 10% greater to 15% greater than the OD of the original backwash filter screen of the HYDROMATION® filter.

Aspect 22. The retrofit kit according to any one of Aspects 1-21, further comprising a media support screen, wherein the media support screen comprises in series from an upstream side to a downstream side during a filtration cycle:
  (a) a second profile wire assembly comprising:
    [1] multiple, spaced apart, parallel lengths of profile wire having an upstream edge and a downstream edge, wherein upstream edges of the profile wire and spaces therebetween define an upstream side of the second profile wire assembly;
    [2] a profile wire cross sectional shape which decreases in width in a downstream direction from the upstream edge which is wider than a downstream edge;
    [3] a space between adjacent parallel lengths of profile wire (slot width) at the upstream edges of the profile wire of from 0.006 inches to 0.016 inches; and
    [4] a width of the upstream edge of the profile wire which provides a total space area (slot area) of from 10% to 30% of the total area of the upstream side of the second profile wire assembly; and
  (b) a second support rod assembly attached to a downstream side of the second profile wire assembly and comprising multiple, spaced apart, parallel lengths of support rod oriented substantially orthogonal to the lengths of profile wire, the support rod and the second support rod assembly having an upstream edge and a downstream edge.

Aspect 23. The retrofit kit according to Aspect 22, wherein the media support screen further comprises:
  (c) a second stiffening rod assembly attached to a downstream side of the second support rod assembly and comprising multiple, spaced apart, parallel lengths of stiffening rod oriented substantially orthogonal to the lengths of support rod, the stiffening rod and the second stiffening rod assembly having an upstream edge and a downstream edge.

Aspect 24. The retrofit kit according to any one of Aspects 22-23, wherein the space between adjacent parallel lengths of profile wire (slot width) at the upstream edges of the profile wire is from 0.008 inches to 0.014 inches, or alternatively, from 0.009 inches to 0.012 inches.

Aspect 25. The retrofit kit according to any one of Aspects 22-23, wherein the space between adjacent parallel lengths of profile wire (slot width) at the upstream edges of the profile wire is 0.010 inches or about 0.010 inches.

Aspect 26. The retrofit kit according to any one of Aspects 22-25, wherein the width of the upstream edge of the profile wire provides a total space area (slot area) of from 12% to 27% of the total area of the upstream side of the second profile wire assembly or alternatively, from 15% to 25%, from 17% to 24%, or from 19% to 23% of the total area of the upstream side of the second profile wire assembly.

Aspect 27. The retrofit kit according to any one of Aspects 22-25, wherein the width of the upstream edge of the profile wire provides a total space area (slot area) of 22.5% or about 22.5% of the total area of the upstream side of the second profile wire assembly.

Aspect 28. The retrofit kit according to any one of Aspects 22-27, wherein the upstream edge of the profile wire has a width of from 0.020 inches to 0.045 inches or alternatively, from 0.025 inches to 0.035 inches, or from 0.028 inches to 0.032 inches.

Aspect 29. The retrofit kit according to any one of Aspects 22-27, wherein the upstream edge of the profile wire has a width of 0.030 inches or about 0.030 inches.

Aspect 30. The retrofit kit according to any one of Aspects 22-27, wherein the profile wire comprises size 30 profile rod.

Aspect 31. The retrofit kit according to any one of Aspects 22-30, wherein the profile wire has a cross sectional shape selected from polygonal, triangular, truncated triangular, truncated triangular with a rounded upstream edge, trapezoidal, trapezoidal with a rounded upstream edge, quadrilateral, semicircular, or T-shaped.

Aspect 32. The retrofit kit according to any one of Aspects 22-31, wherein the profile wire comprises stainless steel.

Aspect 33. The retrofit kit according to any one of Aspects 22-32, wherein the media support screen is formed into two, three, or four modular sections for assembly within a filter tank of a backwashable granular media bed filtration system.

Aspect 34. The retrofit kit according to any one of Aspects 22-32, wherein the media support screen is formed into three modular sections.

Aspect 35. The retrofit kit according to any one of Aspects 22-32, wherein the media support screen is formed into two modular sections.

Aspect 36. The retrofit kit according to any one of Aspects 22-32, wherein the media support screen is formed into two modular sections which are hinged together and folded in a collapsed configuration and unfolded in an expanded configuration.

Aspect 37. The retrofit kit according to any one of Aspects 22-36, wherein the media support screen is formed into a shape to extend horizontally across a cross-section of a vertically-oriented or a horizontally-oriented cylindrical filter tank of a backwashable granular media bed filtration system.

Aspect 38. The retrofit kit according to any one of Aspects 22-37, wherein the media support screen is formed into a disk shape and extends horizontally across a cross-section of a vertically-oriented cylindrical filter tank of a backwashable granular media bed filtration system.

Aspect 39. The retrofit kit according to any one of Aspects 22-38, wherein the media support screen comprises a shape and size to retrofit an original media support screen of a commercial agitator based backwashing nut shell media filter.

Aspect 40. The retrofit kit according to any one of Aspects 22-39, wherein the media support screen comprises a shape and size equivalent to an original media support screen of a HYDROMATION® filter Model Number FDB-7P, FDB-12P, FDB-19P, FDB-28P, FDB-39P, FDB-50P, FDB-64P, FDB-78P, FDB-95P, FDB-113P, FDB-133P, FDB-122P, FDB-162P, FDB-170P, FDB-243P, FDB-324P, FDB-340P, FDB-405P, or FDB-486P.

Aspect 41. The retrofit kit according to any one of Aspects 22-40, wherein the media support screen comprises a shape and size to retrofit an original media support screen of a HYDROMATION® filter Model Number FDB-7P, FDB-12P, FDB-19P, FDB-28P, FDB-39P, FDB-50P, FDB-64P, FDB-78P, FDB-95P, FDB-113P, FDB-133P, FDB-122P, FDB-162P, FDB-170P, FDB-243P, FDB-324P, FDB-340P, FDB-405P, or FDB-486P.

Aspect 42. The retrofit kit according to any one of Aspects 1-41, wherein the support rod of the first support rod assembly or the second support rod assembly, independently, has a cross sectional shape selected from polygonal, circular, triangular, truncated triangular, truncated triangular with a rounded upstream or downstream edge, trapezoidal, trapezoidal with a rounded upstream edge, rectangular, quadrilateral, square, semicircular, V-shaped, or T-shaped.

Aspect 43. The retrofit kit according to any one of Aspects 1-42, wherein the support rod of the first support rod assembly or the second support rod assembly, independently, has a cross sectional shape which increases in width in the downstream direction from an upstream cross sectional edge which is narrower than a downstream cross sectional edge.

Aspect 44. The retrofit kit according to any one of Aspects 1-43, wherein the distance between adjacent parallel lengths of support rod (center-to-center) of the first support rod assembly or the second support rod assembly, independently, at the upstream edge of the support rod is from 2.0 inches to 5.6 inches.

Aspect 45. The retrofit kit according to any one of Aspects 1-43, wherein the distance between adjacent parallel lengths of support rod (center-to-center) of the first support rod assembly or the second support rod assembly, independently, at the upstream edge of the support rod is from 2.8 inches to 4.8 inches.

Aspect 46. The retrofit kit according to any one of Aspects 1-43, wherein the distance between adjacent parallel lengths of support rod (center-to-center) of the first support rod assembly or the second support rod assembly, independently, at the upstream edge of the support rod is about 4 inches, or alternatively, about 3.8 inches.

Aspect 47. The retrofit kit according to any one of Aspects 1-42 or 44-46, wherein the support rod of the first support rod assembly or the second support rod assembly, independently, has a rectangular cross sectional shape having an upstream, a downstream, and two side cross sectional edges, wherein the length of the two side cross section edges is greater than the length of the upstream and downstream cross sectional edges.

Aspect 48. The retrofit kit according to any one of Aspects 1-47, wherein the support rod of the first support rod assembly or the second support rod assembly, independently, is characterized by (a) a width of the upstream edge of the support rod and (b) a distance between adjacent parallel lengths of support rod (center-to-center) which provide a total space area (slot area) of the support rod which is greater than or equal to the total space area of the profile wire.

Aspect 49. The retrofit kit according to any one of Aspects 1-48, wherein the upstream edge of the support rod of the first support rod assembly or the second support rod assembly, independently, has a width of from 0.015 inches to 0.035 inches, alternatively from 0.018 inches to 0.032 inches, or alternatively from 0.020 inches to 0.030 inches.

Aspect 50. The retrofit kit according to any one of Aspects 1-49, wherein the support rod of the first support rod assembly or the second support rod assembly, independently, comprises stainless steel.

Aspect 51. The retrofit kit according to any one of Aspects 1-50, wherein the support rod of the first support rod assembly or the second support rod assembly, independently, comprises number 130 stainless steel support rod.

Aspect 52. The retrofit kit according to any one of Aspects 1-21 or 23-51, wherein the stiffening rod of the first stiffening rod assembly or the second stiffening rod assembly, independently, has a cross sectional shape selected from polygonal, circular, triangular, truncated triangular, truncated triangular with a rounded upstream or downstream edge, trapezoidal, trapezoidal with a rounded upstream edge, rectangular, quadrilateral, square, semicircular, V-shaped, or T-shaped.

Aspect 53. The retrofit kit according to any one of Aspects 1-21 or 23-52, wherein the stiffening rod of the first stiffening rod assembly or the second stiffening rod assembly, independently, has a rectangular cross sectional shape having an upstream, a downstream, and two side cross sectional edges, wherein the length of the two side cross section edges is greater than the length of the upstream and downstream cross sectional edges.

Aspect 54. The retrofit kit according to any one of Aspects 1-21 or 23-53, wherein the distance between adjacent parallel lengths of stiffening rod (center-to-center) of the first stiffening rod assembly or the second stiffening rod assembly, independently, at the upstream edge of the stiffening rod is from 2.2 inches to 6.0 inches.

Aspect 55. The retrofit kit according to any one of Aspects 1-21 or 23-53, wherein the distance between adjacent parallel lengths of stiffening rod (center-to-center) of the first stiffening rod assembly or the second stiffening rod assembly, independently, at the upstream edge of the stiffening rod is from 3.1 inches to 5.1 inches.

Aspect 56. The retrofit kit according to any one of Aspects 1-21 or 23-53, wherein the distance between adjacent parallel lengths of stiffening rod (center-to-center) of the first stiffening rod assembly or the second stiffening rod assembly, independently, at the upstream edge of the stiffening rod is about 4 inches, or alternatively, about 4.1 inches.

Aspect 57. The retrofit kit according to any one of Aspects 1-21 or 23-53, wherein the first stiffening rod assembly or the second stiffening rod assembly, independently, comprises number 130 size stiffening rods transverse to the support rods.

Aspect 58. The retrofit kit according to any one of Aspects 1-21 or 23-57, wherein the first stiffening rod assembly or the second stiffening rod assembly, independently, comprises a number and a spacing between the multiple parallel lengths of stiffening rods sufficient for the media support screen or the backwash filter screen to withstand at least 50 psid (pounds per square inch differential) pressure without irreversible deflection of the first or second support rod assembly by an amount of L/240, wherein L is the length of the parallel lengths of support rod in the first or second support rod assembly.

Aspect 59. A retrofit kit for a backwashable granular media bed filtration system, the kit comprising a media support screen, wherein the media support screen comprises, in series from an upstream side to a downstream side during a filtration cycle:
(a) a perforated sheet metal layer, comprising perforations having a major axis which impart an open area to the perforated sheet metal layer of from 10% to about 50%, and an average size (major axis) of from 0.008 inches to 0.016 inches; and
(b) a support rod assembly attached to a downstream side of the profile wire assembly and comprising multiple, spaced apart, parallel lengths of support rod oriented substantially orthogonal to the lengths of profile wire, the support rod and support rod assembly having an upstream edge and a downstream edge.

Aspect 60. The retrofit kit according to Aspect 59, further comprising:
(c) a stiffening rod assembly attached to a downstream side of the support rod assembly and comprising multiple, spaced apart, parallel lengths of stiffening rod oriented substantially orthogonal to the lengths of support rod, the stiffening rod and stiffening rod assembly having an upstream edge and a downstream edge.

Aspect 61. The retrofit kit according to any one of Aspects 59-60, wherein the perforated sheet metal layer comprises an open (perforated) area of from about 15% to about 35% of the total area of the sheet metal layer including the perforations.

Aspect 62. The retrofit kit according to any one of Aspects 59-61, wherein the perforated sheet metal layer comprises perforations having an average size (major axis) of from 0.008 inches to 0.012 inches.

Aspect 63. The retrofit kit according to any one of Aspects 59-62, wherein the perforated sheet metal layer comprises perforations in the shape of a circle, a polygon, a triangle, a square, a rectangle, a rounded-end rectangle, a hexagon, an ellipse, a diamond, or any combination thereof.

Aspect 64. The retrofit kit according to any one of Aspects 1-63, further comprising an impeller having vanes, wherein at least a portion of the impeller vane surfaces is coated with an abrasion resistant material.

Aspect 65. The retrofit kit according to Aspect 64, wherein the impeller is configured to attach to a drive element which rotates the impeller about a vertical axis and disperses the granular filtration media within a liquid during the backwash cycle.

Aspect 66. The retrofit kit according to any one of Aspects 64-65, wherein at least a portion of the impeller vane surfaces is coated with an abrasion resistant material comprising or selected from rubber.

Aspect 67. The retrofit kit according to any one of Aspects 64-66, wherein at least a portion of the impeller vane surfaces is coated with an abrasion resistant material having an ASTM D2240 type A Shore hardness of 40 or greater.

Aspect 68. The retrofit kit according to any one of Aspects 64-66, wherein at least a portion of the impeller vane surfaces is coated with an abrasion resistant material having an ASTM D2240 type A Shore hardness of 50 or greater.

Aspect 69. The retrofit kit according to any one of Aspects 64-66, wherein at least a portion of the impeller vane surfaces is coated with an abrasion resistant material having an ASTM D2240 type A Shore hardness of from 40 to 75.

Aspect 70. The retrofit kit according to any one of Aspects 64-69, wherein at least a portion of the impeller vane surfaces is coated with a fluoroelastomer as defined in ASTM D1418.

Aspect 71. The retrofit kit according to any one of Aspects 64-69, wherein at least a portion of the impeller vane surfaces is coated with: silicone; Buna-N rubber (NBR); ethylene propylene diene monomer rubber (EPDM); a fluoroelastomer; an FKM fluoroelastomer; VITION®; a copolymer of hexafluoropropylene (HFP) and vinylidene fluoride (VDF or VF2); a terpolymer of tetrafluoroethylene (TFE), vinylidene fluoride (VDF) and hexafluoropropylene (HFP); a perfluoromethylvinylether (PMVE)-containing elastomer; neoprene rubber; gum rubber; styrene-butadiene rubber (SBR); or urethane rubber.

Aspect 72. The retrofit kit according to any one of Aspects 64-69, wherein at least a portion of the impeller vane surfaces is coated with Buna-N rubber to a thickness of ⅛ inch.

Aspect 73. The retrofit kit according to any one of Aspects 64-72, wherein the impeller comprises a shape and size to retrofit an original impeller of a commercial agitator-based backwashing nut shell media filter.

Aspect 74. The retrofit kit according to any one of Aspects 64-73, wherein the impeller comprises a shape and size equivalent to an original impeller of a HYDROMATION® filter Model Number FDB-7P, FDB-12P, FDB-19P, FDB-28P, FDB-39P, FDB-50P, FDB-64P, FDB-78P, FDB-95P, FDB-113P, FDB-133P, FDB-122P, FDB-162P, FDB-170P, FDB-243P, FDB-324P, FDB-340P, FDB-405P, or FDB-486P.

Aspect 75. The retrofit kit according to any one of Aspects 64-74, wherein the impeller comprises a shape and size to retrofit an original impeller of a HYDROMATION® filter Model Number FDB-7P, FDB-12P, FDB-19P, FDB-28P, FDB-39P, FDB-50P, FDB-64P, FDB-78P, FDB-95P, FDB-113P, FDB-133P, FDB-122P, FDB-162P, FDB-170P, FDB-243P, FDB-324P, FDB-340P, FDB-405P, or FDB-486P.

Aspect 76. A backwashable granular media bed filtration system, the system comprising:
(a) a filter tank for containing a liquid and having [1] an internal space adapted to receive a contaminated liquid, [2] a first filter inlet adapted to direct a contaminated liquid into the filter tank, and [3] a first filter outlet adapted to direct a filtered liquid out of the filter tank;
(b) a media support screen extending horizontally across a cross-section of the tank and having a top and a bottom, wherein the first filter inlet is upstream of the media support screen, and the first filter outlet is downstream of the media support screen;
(c) a granular filtration media positioned within the filter tank upstream of the media support screen and which rests on top of the media support screen during a filtration cycle; and
(d) a backwash agitator assembly, comprising: [1] an impeller having vanes positioned within the internal space of the tank and adapted to disperse the filtration media within the liquid contained in the tank; [2] a periodically-operated drive element adapted to rotate the impeller about an axis and disperse the filtration media within a backwash liquid during a backwash cycle; [3] a backwash filter screen above the granular filtration media when the granular filtration media is resting on top of the media support screen and having openings formed therein which are sized to prevent passage of the granular filtration media therethrough during the backwash cycle, and [4] a second filter outlet adapted to receive the backwash liquid after passage through the backwash filter screen during the backwash cycle and direct the backwash liquid out of the filter tank;
wherein the backwash filter screen, the media support screen, the impeller, or any combination thereof is as described and disclosed herein.

Aspect 77. The backwashable granular media bed filtration system according to Aspect 76, wherein the backwash filter screen comprises a shape and size equivalent to an original backwash filter screen of a HYDROMATION® filter Model Number FDB-7P, FDB-12P, FDB-19P, FDB-28P, FDB-39P, FDB-50P, FDB-64P, FDB-78P, FDB-95P, FDB-113P, FDB-133P, FDB-122P, FDB-162P, FDB-170P, FDB-243P, FDB-324P, FDB-340P, FDB-405P, or FDB-486P.

Aspect 78. The backwashable granular media bed filtration system according to any one of Aspects 76-77, wherein the backwash filter screen comprises a shape and size to retrofit an original backwash filter screen of a HYDROMATION® filter Model Number FDB-7P, FDB-12P, FDB-19P, FDB-28P, FDB-39P, FDB-50P, FDB-64P, FDB-78P, FDB-95P, FDB-113P, FDB-133P, FDB-122P, FDB-162P, FDB-170P, FDB-243P, FDB-324P, FDB-340P, FDB-405P, or FDB-486P.

Aspect 79. A process for removing oil and particulate contaminants from contaminated water, comprising the steps of:
(a) flowing water contaminated with suspended oil droplets and/or particulates through a filter bed comprising a granular media supported on a media support screen;
(b) coalescing at least a portion of the oil droplets during flow and retaining the coalesced oil in the filter bed and retaining at least a portion of the particulates in the filter bed;
(c) terminating the flow of contaminated water after the coalesced oil and/or particulates have been retained in the filter bed;
(d) turbulently backwashing the filter bed with retained oil and particulate contaminants with a backwash liquid to release the contaminants, and separating the released contaminants from the backwashed filter bed through a backwash filter screen; and
(e) re-initiating the flow of water contaminated with suspended oil droplets and/or particulates through the filter bed;
wherein the backwash filter screen, the media support screen, or a combination thereof is as described and disclosed herein.

Aspect 80. The process according to Aspect 79, further comprising sparging the backwash liquid with a gas while turbulently backwashing the filter bed with the backwash liquid.

Aspect 81. The process according to any one of Aspects 79-80, wherein the gas is an inert gas.

Aspect 82. The process according to any one of Aspects 79-81, wherein the turbulent backwashing occurs by flowing the backwash liquid upwardly through the filter bed to expand the bed and release the contaminants.

Aspect 83. The process according to any one of Aspects 79-82, wherein the backwash liquid is water.

Aspect 84. A retrofit kit for a backwashable granular media bed filtration system, the kit comprising a media support screen, wherein the media support screen comprises in series from an upstream side to a downstream side during a filtration cycle:

(a) a second profile wire assembly comprising:
  [1] multiple, spaced apart, parallel lengths of profile wire having an upstream edge and a downstream edge, wherein upstream edges of the profile wire and spaces therebetween define an upstream side of the second profile wire assembly;
  [2] a profile wire cross sectional shape which decreases in width in a downstream direction from the upstream edge which is wider than a downstream edge;
  [3] a space between adjacent parallel lengths of profile wire (slot width) at the upstream edges of the profile wire of from 0.006 inches to 0.016 inches; and
  [4] a width of the upstream edge of the profile wire which provides a total space area (slot area) of from 10% to 30% of the total area of the upstream side of the second profile wire assembly; and
(b) a second support rod assembly attached to a downstream side of the second profile wire assembly and comprising multiple, spaced apart, parallel lengths of support rod oriented substantially orthogonal to the lengths of profile wire, the support rod and the second support rod assembly having an upstream edge and a downstream edge.

Aspect 85. The retrofit kit according to Aspect 84, wherein the media support screen further comprises:
  (c) a second stiffening rod assembly attached to a downstream side of the second support rod assembly and comprising multiple, spaced apart, parallel lengths of stiffening rod oriented substantially orthogonal to the lengths of support rod, the stiffening rod and the second stiffening rod assembly having an upstream edge and a downstream edge.

What is claimed is:

1. A retrofit kit for a backwashable granular media bed filtration system, the kit comprising a cylindrical backwash filter screen having an annular cross section, an upstream side corresponding to an outer surface, and a downstream side corresponding to an inner surface, wherein the backwash filter screen comprises, in series from the upstream side to the downstream side:
  (a) a first profile wire assembly comprising:
    [1] multiple, spaced apart, parallel lengths of a first profile wire formed into a cylinder, each first profile wire having an upstream edge and a downstream edge, wherein the upstream edges of the multiple, spaced apart, parallel lengths of the first profile wires and spaces therebetween define an upstream side of the first profile wire assembly, wherein the upstream side of the first profile wire assembly has a total area;
    [2] a first profile wire cross sectional shape which decreases in width in a downstream direction from the upstream edge of the first profile wire, wherein the upstream edge is wider than the downstream edge;
    [3] a slot width between adjacent parallel lengths of first profile wire at the upstream edges of the first profile wires of from 0.007 inches to 0.013 inches; and
    [4] a width of the upstream edge of each first profile wire which provides a total slot area of from 20% to 30% of the total area of the upstream side of the first profile wire assembly;
  (b) a first support rod assembly attached to a downstream side of the first profile wire assembly and comprising multiple, spaced apart, parallel lengths of a first support rod formed into a cylinder, each first support rod oriented substantially orthogonal to the lengths of first profile wire, wherein each first support rod has an upstream edge and a downstream edge, and wherein the upstream edges of the first support rods and spaces therebetween define an upstream side of the first support rod assembly; and
  (c) a first stiffening rod assembly attached to a downstream side of the first support rod assembly and comprising multiple, spaced apart, parallel lengths of a first stiffening rod formed into a cylinder, each first stiffening rod oriented substantially orthogonal to the lengths of first support rod, wherein each first stiffening rod has an upstream edge and a downstream edge, and wherein the upstream edges of the first stiffening rods and spaces therebetween define an upstream side of the first stiffening rod assembly;
  wherein the upstream edge of each first profile wire and spaces therebetween, each first support rod, and each first stiffening rod corresponds to the edge closer to the outer surface of the cylindrical backwash filter screen, while the downstream edge of each first profile wire and spaces therebetween, each first support rod, and each first stiffening rod corresponds to the edge closer to the inner surface of the cylindrical backwash filter screen; and
  wherein the upstream side of the first profile wire assembly, the first support rod assembly, and the first stiffening rod assembly corresponds to the side closer to the outer surface of the cylindrical backwash filter screen, while the downstream side of the first profile wire assembly, the first support rod assembly, and the first stiffening rod assembly corresponds to the side closer to the inner surface of the cylindrical backwash filter screen.

2. The retrofit kit according to claim 1, wherein:
  (a) the backwash filter screen comprises a cylindrical shape having an annular cross section with an outer surface and an inner surface, and having an interior space adapted to allow a backwash liquid to pass from the exterior of the backwash filter screen into the internal annular space during the backwash cycle;
  (b) the parallel lengths of first profile wire in the first profile wire assembly are formed into circumferential rings at the outer surface of the annular cross section;
  (c) the parallel lengths of first support rod in the first support rod assembly are oriented parallel to the length of the cylindrical shape substantially orthogonal to the lengths of first profile wire; and
  (d) the parallel lengths of first stiffening rod in the first stiffening rod assembly are formed into circumferential rings at the inner surface of the annular cross section.

3. The retrofit kit according to claim 1, wherein the slot width between adjacent parallel lengths of first profile wire in the first profile wire assembly in the backwash filter screen at the upstream edges of the first profile wires is from 0.009 inches to 0.011 inches.

4. The retrofit kit according to claim 1, wherein the width of the upstream edges of the first profile wires in the first profile wire assembly provides the total slot area of from 22% to 28% of the total area of the upstream side of the first profile wire assembly.

5. The retrofit kit according to claim 1, wherein the upstream edges of the first profile wires in the first profile wire assembly have a width of from 0.025 inches to 0.035 inches.

6. The retrofit kit according to claim 1, wherein each first profile wire in the first profile wire assembly has a cross sectional shape selected from polygonal, triangular, truncated triangular, truncated triangular with a rounded upstream edge, trapezoidal, trapezoidal with a rounded upstream edge, quadrilateral, semicircular, or T-shaped.

7. The retrofit kit according to claim 2, wherein the cylindrical shape of the backwash filter screen comprises a vertical axis and a circumference around the outer surface of the annular cross section, and wherein the backwash filter screen is formed into two, three, or four modular sections for assembly within a filter tank of a backwashable granular media bed filtration system, wherein each modular section is separated from each adjacent modular section by one or more vertical planes, each plane containing the vertical axis of the backwash filter screen, and wherein each modular section spans 1/n of the circumference, wherein n is 2, 3, or 4 for the two, three, or four modular sections, respectively.

8. The retrofit kit according to claim 1, further comprising a media support screen, wherein the media support screen comprises in series from an upstream side to a downstream side during a filtration cycle:
  (a) a second profile wire assembly comprising:
    [1] multiple, spaced apart, parallel lengths of a second profile wire, each second profile wire having an upstream edge and a downstream edge, wherein the upstream edges of the second profile wires and spaces therebetween define an upstream side of the second profile wire assembly wherein the upstream side of the second profile wire assembly has a total area;
    [2] a second profile wire cross sectional shape which decreases in width in a downstream direction from the upstream edge of the second profile wire, wherein the upstream edge is wider than the downstream edge;
    [3] a slot width between adjacent parallel lengths of second profile wire at the upstream edges of the second profile wires of from 0.006 inches to 0.016 inches; and
    [4] a width of the upstream edge of each second profile wire which provides a total slot area of from 10% to 30% of the total area of the upstream side of the second profile wire assembly; and
  (b) a second support rod assembly attached to a downstream side of the second profile wire assembly and comprising multiple, spaced apart, parallel lengths of a second support rod, each second support rod oriented substantially orthogonal to the lengths of second profile wire, wherein each second support rod has an upstream edge and a downstream edge, and wherein the upstream edges of the second support rods and spaces therebetween define an upstream side of the second support rod assembly;
  wherein the upstream edge of each second profile wire and spaces therebetween and each second support rod corresponds to the edge closer to the upstream side of the media support screen, while the downstream edge of each second profile wire and spaces therebetween and each second support rod corresponds to the edge closer to the downstream side of the media support screen; and
  wherein the upstream side of the second profile wire assembly and the second support rod assembly corresponds to the side closer to the upstream side of the media support screen, while the downstream side of the second profile wire assembly and the second support rod assembly corresponds to the side closer to the downstream side of the media support screen.

9. The retrofit kit according to claim 8, wherein the media support screen further comprises:
  (c) a second stiffening rod assembly attached to a downstream side of the second support rod assembly and comprising multiple, spaced apart, parallel lengths of a second stiffening rod, each second stiffening rod oriented substantially orthogonal to the lengths of second support rod, wherein each second stiffening rod has an upstream edge and a downstream edge, and wherein the upstream edges of the second stiffening rods and spaces therebetween define an upstream side of the second stiffening rod assembly;
  wherein the upstream edge of each second stiffening rod corresponds to the edge closer to the upstream side of the media support screen, while the downstream edge of each second stiffening rod corresponds to the edge closer to the downstream side of the media support screen; and
  wherein the upstream side of the second stiffening rod assembly corresponds to the side closer to the upstream side of the media support screen, while the downstream side of the second stiffening rod assembly corresponds to the side closer to the downstream side of the media support screen.

10. The retrofit kit according to claim 8, wherein the slot width between adjacent parallel lengths of second profile wire in the second profile wire assembly at the upstream edges of the second profile wire are from 0.008 inches to 0.014 inches.

11. The retrofit kit according to claim 8, wherein the width of the upstream edges of the second profile wires in the second profile wire assembly provides the total slot area of from 12% to 27% of the total area of the upstream side of the second profile wire assembly.

12. The retrofit kit according to claim 8, wherein the upstream edges of the second profile wires in the second profile wire assembly have a width of from 0.020 inches to 0.045 inches.

13. The retrofit kit according to claim 8, wherein the upstream edges of the second profile wires in the second profile wire assembly have a width of 0.025 inches or about 0.035 inches.

14. The retrofit kit according to claim 8, wherein each second profile wire in the second profile wire assembly has a cross sectional shape selected from polygonal, triangular, truncated triangular, truncated triangular with a rounded upstream edge, trapezoidal, trapezoidal with a rounded upstream edge, quadrilateral, semicircular, or T-shaped.

15. The retrofit kit according to claim 8, wherein the media support screen is formed into two modular sections connected with a hinge, configured to allow folding of the media support screen into a collapsed configuration for insertion within a filter tank of a backwashable granular media bed filtration system and subsequently unfolded for securing inside the tank.

16. The retrofit kit according to claim 1, wherein:
  (a) each first support rod has a cross sectional shape selected from polygonal, circular, triangular, truncated triangular, truncated triangular with a rounded upstream or downstream edge, trapezoidal, trapezoidal with a rounded upstream edge, rectangular, quadrilateral, square, semicircular, V-shaped, or T-shaped; and
  (b) the center-to-center distance between directly adjacent parallel lengths of first support rod at the upstream edge of the first support rod is from 2.0 inches to 5.6 inches.

17. The retrofit kit according to claim 1, wherein each first support rod has a rectangular cross sectional shape having an upstream edge, a downstream edge, and two side cross sectional edges, wherein the length of the two side cross sectional edges is greater than the length of the upstream cross sectional edge and downstream cross sectional edge.

18. The retrofit kit according to claim 1, wherein the upstream edge of each first support rod has a width of from 0.015 inches to 0.035 inches.

19. The retrofit kit according to claim 1, wherein each first stiffening rod of the first stiffening rod assembly has a cross sectional shape selected from polygonal, circular, triangular, truncated triangular, truncated triangular with a rounded upstream or downstream edge, trapezoidal, trapezoidal with a rounded upstream edge, rectangular, quadrilateral, square, semicircular, V-shaped, or T-shaped.

20. The retrofit kit according to claim 1, wherein each first stiffening rod of the first stiffening rod assembly has a rectangular cross sectional shape having an upstream edge, a downstream edge, and two side cross sectional edges, wherein the length of the two side cross section edges is greater than the length of the upstream cross sectional edge and downstream cross sectional edge.

21. The retrofit kit according to claim 1, wherein center-to-center distance between directly adjacent parallel lengths of first stiffening rod of the first stiffening rod assembly at the upstream edges of the first stiffening rods is from 2.2 inches to 6.0 inches.

22. The retrofit kit according to claim 1, wherein the first stiffening rod assembly comprises a spacing between the multiple parallel lengths of first stiffening rods which is less than or equal to a distance required for the backwash filter screen to withstand 50 pounds per square inch differential pressure without irreversible deflection of the first support rod assembly in response to the differential pressure by an amount of L/240 or greater, wherein L is the length of the parallel lengths of first support rod in the first support rod assembly.

23. The retrofit kit according to claim 1, further comprising an impeller having vanes, wherein at least a portion of each impeller vane surface is coated with an abrasion resistant material comprising a rubber, and wherein the impeller is configured to attach to a drive element of a backwashable granular media bed filtration system, wherein the drive elements has a rotational axis, which rotates the impeller about the rotational axis and disperses the granular filtration media within a liquid during the backwash cycle.

24. The retrofit kit according to claim 23, wherein at least a portion of each impeller vane surface is coated with an abrasion resistant material having an ASTM D2240 type A Shore hardness of 40 or greater.

25. The retrofit kit according to claim 23, wherein at least a portion of the impeller vane surfaces is coated with: silicone; Buna-N rubber; ethylene propylene diene monomer rubber; a fluoroelastomer as defined in ASTM D1418; a Fluorine Kautschuk Material fluoroelastomer; a copolymer of hexafluoropropylene and vinylidene fluoride; a terpolymer of tetrafluoroethylene, vinylidene fluoride and hexafluoropropylene; a perfluoromethylvinylether containing elastomer; neoprene rubber; gum rubber; styrene-butadiene rubber, or urethane rubber.

26. The retrofit kit according to claim 1, wherein the first support rod cross sectional shape increases in width in the downstream direction from an upstream cross sectional edge which is narrower than a downstream cross sectional edge.

* * * * *